US008947712B2

(12) United States Patent
Arai

(10) Patent No.: US 8,947,712 B2
(45) Date of Patent: Feb. 3, 2015

(54) IMAGE DATA PROCESSING DEVICE, PROGRAM, AND MANAGEMENT DEVICE THAT ARE ABLE TO MANAGE VARIOUS TYPES OF INFORMATION IN A CENTRALIZED MANNER

(71) Applicant: Tomomi Arai, Nagoya (JP)

(72) Inventor: Tomomi Arai, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 4 days.

(21) Appl. No.: 13/833,384

(22) Filed: Mar. 15, 2013

(65) Prior Publication Data

US 2013/0258402 A1    Oct. 3, 2013

(30) Foreign Application Priority Data

Mar. 30, 2012 (JP) ................. 2012-082821

(51) Int. Cl.
*G06F 3/12* (2006.01)
*G06K 15/00* (2006.01)
*H04N 1/40* (2006.01)
*H04N 1/00* (2006.01)

(52) U.S. Cl.
CPC ............ *G06K 15/40* (2013.01); *H04N 1/00344* (2013.01)
USPC ........ 358/1.15; 358/1.13; 358/1.14; 358/3.23

(58) Field of Classification Search
USPC ............. 358/1.15, 1.16, 1.14, 1.13, 1.1, 3.23, 358/448; 715/200, 204, 734, 736, 740, 741, 715/742, 747, 751, 753, 760, 765; 709/225, 709/246, 230, 223, 220, 212, 214; 710/1, 5, 710/15, 18, 22, 26, 32, 104, 105
See application file for complete search history.

(56) References Cited

U.S. PATENT DOCUMENTS

| | | | |
|---|---|---|---|
| 2007/0019019 A1 | 1/2007 | Yoshikawa et al. | |
| 2008/0184235 A1* | 7/2008 | Sawada et al. | ................ 718/100 |
| 2010/0271650 A1* | 10/2010 | Tomizawa et al. | ........... 358/1.13 |
| 2012/0069371 A1* | 3/2012 | Fujii | ........................... 358/1.13 |

FOREIGN PATENT DOCUMENTS

JP    2007-030190 A    2/2007

* cited by examiner

*Primary Examiner* — Ngon Nguyen
(74) *Attorney, Agent, or Firm* — Scully, Scott, Murphy & Presser, P.C.

(57) ABSTRACT

An image data processing device may be configured to be used in a system. The system may comprise the image data processing device, a management device and a plurality of electronic devices. The image data processing device may comprise a communication unit configured to communicate with the electronic device by using the first communication scheme. The image data processing device may cause, in a case where the communication unit receives the judgment information from the electronic device, a storing unit to store the received judgment information. The image data processing device may execute the image data processing in a case where it is determined that the processor is able to execute the image data processing based on the judgment information stored by the storing unit.

19 Claims, 15 Drawing Sheets

FIG. 13

| Registration Mobile Phone-ID | Judgment Information | Logged-in Flag | Logged-in MFP-ID |
|---|---|---|---|
| First Mobile Phone-ID | Restriction on Print Volume : 95 Sheets<br>Restriction on Print Paper :<br>    A3 Size up to 15 Sheets<br>Restriction on Print Color :<br>    Color Printing up to 5 Sheets | OFF | — |
| Second Mobile Phone-ID | Restriction on Print Volume: 500 Sheets<br>Restriction on Print Paper : None<br>Restriction on Print Color : None | OFF | — |

# IMAGE DATA PROCESSING DEVICE, PROGRAM, AND MANAGEMENT DEVICE THAT ARE ABLE TO MANAGE VARIOUS TYPES OF INFORMATION IN A CENTRALIZED MANNER

CROSS-REFERENCE TO RELATED APPLICATIONS

This application claims priority to Japanese Patent Application No. 2012-082821, filed on Mar. 30, 2012, the contents of which are hereby incorporated by reference into the present application.

TECHNICAL FIELD

The technique disclosed in this description relates to image data processing device, program, and management device that are able to manage various types of information in a centralized manner.

DESCRIPTION OF RELATED ART

A system in which a plurality of image forming apparatuses is communicably connected to a server via a network, and the server manages the state of the plurality of image forming apparatuses in a centralized manner is known. In such a system, when a user logs in to an image forming apparatus, the image forming apparatus sends a request to the server to borrow a print volume. The server lends the print volume to the image forming apparatus when the logged-in user is allowed to borrow the print volume. The image forming apparatus returns the number of sheets obtained by subtracting the number of sheets used for printing from the borrowed print volume to the server after executing printing.

SUMMARY

An image forming apparatus may not be always connected to a network. In this case, it is difficult for a server to manage the state of the image forming apparatus in a centralized manner. This description provides a technique that can solve such a problem.

An art disclosed by the present specification is an image data processing device configured to be used in a system. The system may comprise the image data processing device, a management device and a plurality of electronic devices. The management device may be configured to store, for each of the plurality of electronic devices, judgment information corresponding to the electronic device. The judgment information may be for causing a processor to judge whether or not the processor is able to execute an image data processing. Each of the plurality of electronic devices may be configured to execute a communication by using a first communication scheme with the image data processing device. Each of the plurality of electronic devices may be configured to execute a communication by using a second communication scheme with the management device. The first communication scheme may differ from the second communication scheme. Each of the plurality of electronic devices may be configured to receive the judgment information corresponding to the electronic device thereof from the management device. The image data processing device may comprise a communication unit and the processor. The communication unit may be configured to communicate with the electronic device by using the first communication scheme. The processor may be configured to perform: (A) causing, in a case where the communication unit receives the judgment information from the electronic device, a storing unit to store the received judgment information; and, (B) processing the image data. The above (B) may execute the image data processing in a case where it is determined that the processor is able to execute the image data processing based on the judgment information stored by the storing unit.

In the image data processing device disclosed in this specification, it is possible to relay communication of the judgment information between the management device and the image data processing device by using the electronic device that communicates with the image data processing device by the first communication scheme and communicates with the management device by the second communication scheme. The management device stores the judgment information for judging whether it is possible to execute the image data processing. Thus, the image data processing module may execute an image data processing based on the judgment information stored in the management device. An example of the image data processing based on the judgment information includes a process for executing a printing within a range of printable volume, if the judgment information is information for representing the printable volume. It is possible to control the image data processing in the image data processing device by the judgment information stored in the management device.

Definitions of the wordings "data" and "information" will be described. "Data" means data itself which is used by a computer of an image data processing device or an electronic device. "Information" is information which is used by a computer when making various judgments and means conceptual information when data is provided to the computer as a medium rather than the data itself. In this description, "data" and "information" are explicitly distinguished and used as described above.

Further, a control method and a computer program for realizing the image data processing device described above, and a computer readable recording device which includes the computer program, are also novel and useful.

BRIEF DESCRIPTION OF THE DRAWINGS

FIG. 13 shows an example of the management table.

EMBODIMENT

Figure 1:
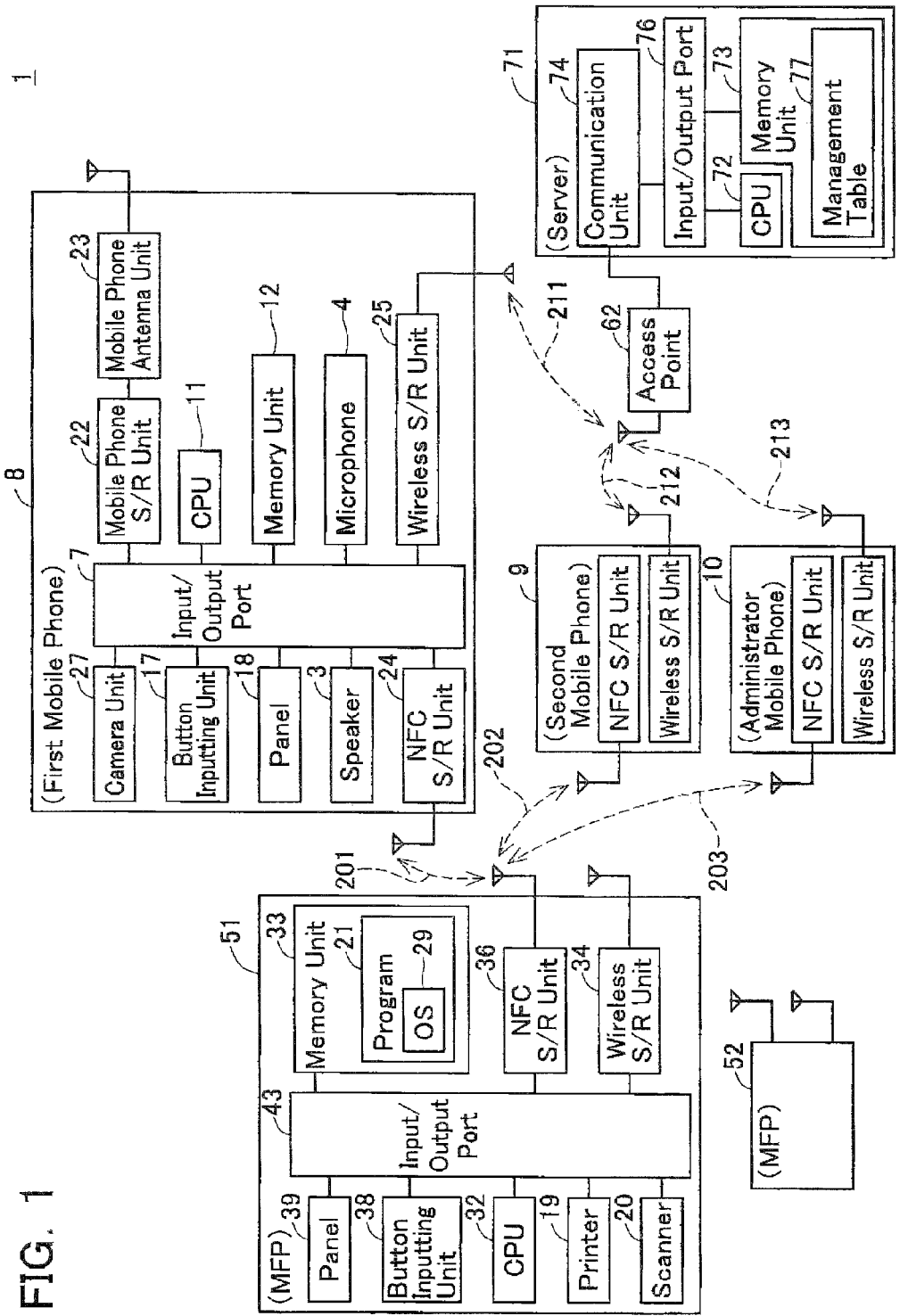
FIG. 1 shows a block diagram of a printing system.
Figure 2:
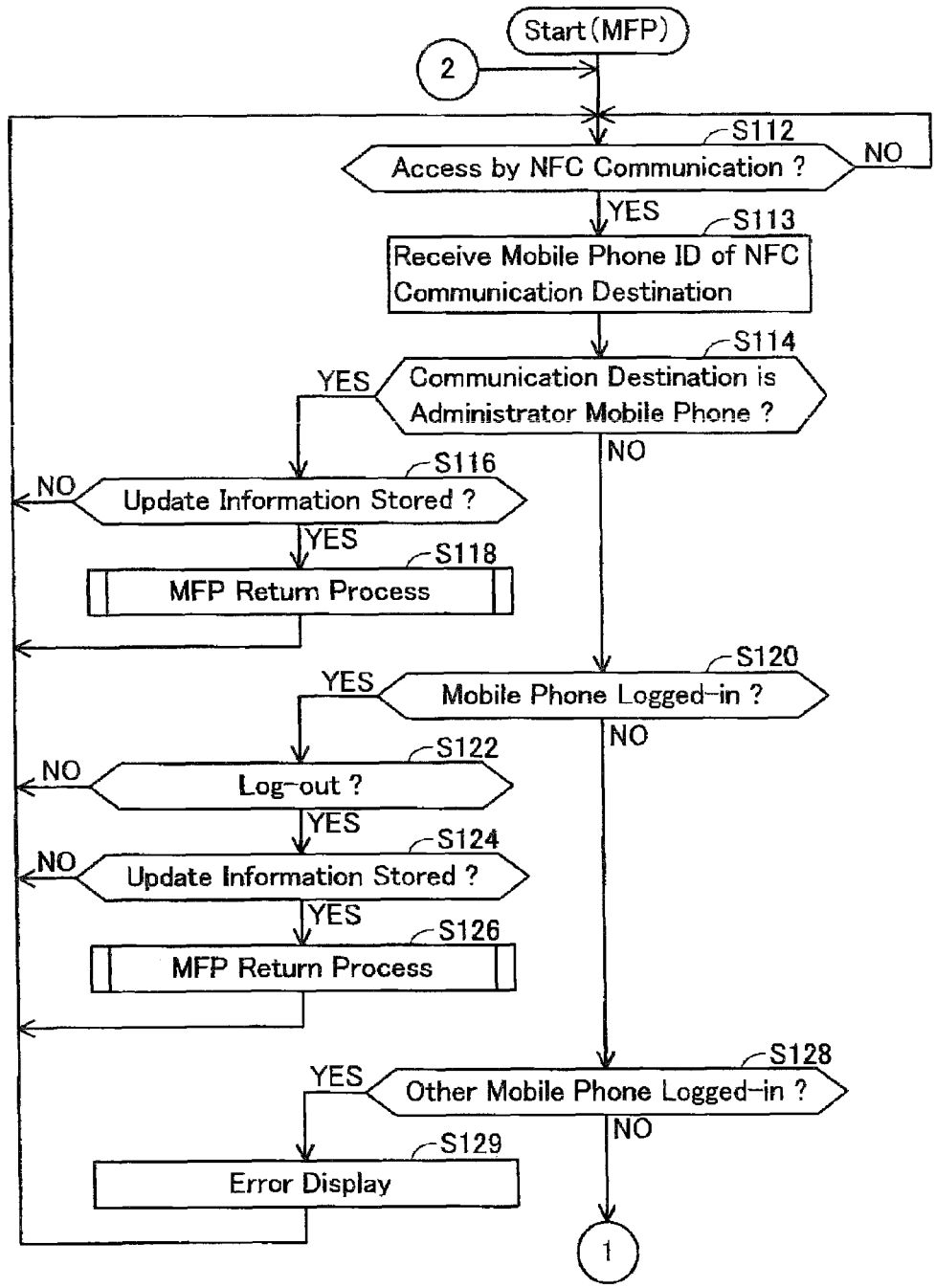
FIG. 2 shows an operational flowchart of an MFP.

FIG. 1 shows a block diagram of a printing system 1 according to an embodiment of the present application. The printing system 1 includes a first mobile phone 8, a second mobile phone 9, an administrator mobile phone 10, multifunction peripherals (abbreviated as MFPs) 51 and 52, access point 62, and a server 71. The first mobile phone 8, the second mobile phone 9, the administrator mobile phone 10, and the MFPs 51 and 52 have the function of an existing wireless LAN terminal and the function of an existing near field communication (abbreviated as NFC) terminal. Moreover, the MFPs 51 and 52 are multifunction peripherals which have a printer function, a scanner function, a copying function, and the like. The access point 62 has the function of an existing wireless LAN access point. The server 71 is connected to the access point 62.

An NFC sending and receiving (abbreviated as S/R) unit 36 of the MFP 51 performs NFC communications 201 to 203 respectively with the first mobile phone 8, the second mobile phone 9, and the administrator mobile phone 10 so as to send and receive a digital signal that constitutes various items of data. Moreover, a communication unit 74 of the server 71 performs wireless LAN communications 211 to 213 respectively with the first mobile phone 8, the second mobile phone 9, and the administrator mobile phone 10 via the access point 62. That is, the MFP 51 is configured to be capable of performing data communication with the server 71 via the first mobile phone 8, the second mobile phone 9, and the administrator mobile phone 10. Further, the MFP 51 is set to be not capable of performing wireless LAN communication using a wireless S/R unit although the MFP 51 includes a wireless S/R unit 34. The MFP 52 is also configured to be capable of performing data communication with the server 71 via the first mobile phone 8, the second mobile phone 9, and the administrator mobile phone 10 similarly to the MFP 51. However, communication paths of the MFP 52 are not shown in FIG. 1 to simplify the drawing. An example of the wireless LAN scheme includes a communication scheme which is specified according to IEEE 802.11a/b/g/n standards.

An overview of the printing system 1 will be described. The printing system 1 is a system in which the server 71 can manage the judgment information of each user in a centralized manner. Since each mobile phone is possessed by each user, the judgment information of each user is judgment information corresponding to each of the first mobile phone 8 and the second mobile phone 9. The judgment information is information for judging restrictions (for example, a printable volume) when the MFPs 51 and 52 execute various processes. Since the judgment information is managed by the server 71 in a unified manner rather than managing the same by the respective MFPs 51 and 52, it is possible to control the right of each user on MFP operations.

<Configuration of MFP 51>

A configuration of the MFP 51 will be described. The MFP 51 includes, as its main components, a central processing unit (abbreviated as CPU) 32, a memory unit 33, a wireless S/R unit 34, NFC S/R unit 36, a button inputting unit 38, a panel 39, a printer 19, and a scanner 20. These components can communicate with each other via an input/output port 43.

The CPU 32 executes a program 21 stored in the memory unit 33. In the following description, the CPU 32 that executes a program such as an operating system (abbreviated as OS) 29 may be described by a program name. For example, the description "the OS 29" may mean "the CPU 32 executing the OS 29."

The memory unit 33 includes a combination of a random access memory (abbreviated as RAM), a read only memory (abbreviated as ROM), a flash memory, a hard disk (abbreviated as HDD), a buffer included in the CPU 72, and the like. The memory unit 33 stores the program 21. The program 21 includes the OS 29 and the like. The OS 29 includes a program or the like for causing the NFC S/R unit 36 to execute communication. Further, the OS 29 is also a program that provides an application programming interface (abbreviated as API) that allows each program to acquire information that is acquired by various items of hardware or allows each program to issue instructions to various items of hardware.

The memory unit 33 stores a mobile phone ID, judgment information, update information, wireless LAN restriction information, a log-in flag, image data, an administrator mobile phone ID, an MFP-ID 51a, and the like.

The mobile phone ID is information for identifying each of the first mobile phone 8, the second mobile phone 9, and the administrator mobile phone 10. The judgment information is information for judging which the MFP 51 can execute various processes. An example of the information included in the judgment information includes a printable volume (for example, 100 sheets), a printable paper size (for example, printable only A4 size), and a printable color mode (for example, black-and-white printing only). The judgment information is stored in association with the mobile phone ID.

The update information is information for updating the judgment information. An example of the information included in the judgment information includes the number of printed sheets. An example of a method of updating the judgment information includes a method of subtracting the number of printed sheets from the printable volume.

The wireless LAN restriction information is information on whether wireless LAN communication of the wireless S/R unit 34 will be restricted or not. The log-in flag is information that stores which mobile phone is logged in to the MFP 51. Since each mobile phone is possessed by each user, the expression "a mobile phone logs in to the MFP 51" has the same meaning as the expression "a user logs in to the MFP 51." The log-in flag is stored in the memory unit 33 in association with the mobile phone ID.

The image data is data which is used in the printing process of the printer 19. The administrator mobile phone ID is information for identifying the administrator mobile phone 10. The administrator mobile phone 10 is a predetermined mobile phone that sends the update information as a proxy. The MFP-ID 51a is information for identifying the MFP 51. A manufacturing serial number of the MFP 51 may be used as the MFP-ID 51a, for example.

The button inputting unit 38 includes keys for executing respective functions of the MFP 51. The button inputting unit 38 may be integrated with the panel 39 as a touch panel. The panel 39 displays various items of functional information of the MFP 51. The wireless S/R unit 34 performs wireless LAN communication pursuant to an infrastructure mode of the wireless LAN scheme. That is, the wireless S/R unit 34 performs wireless LAN communication according to such a scheme that data communication is performed via an access point using radio waves. However, in this embodiment, the wireless S/R units 34 of both MFPs 51 and 52 are configured so as not to perform wireless LAN communication. The NFC S/R unit 36 performs NFC communications 201 to 203 with the first mobile phone 8, the second mobile phone 9, and the administrator mobile phone 10. The NFC communications 201 to 203 are near-field wireless communications according to an NFC interface protocol communication scheme and are very short-ranged communications, in each of which a communication range is within approximately 1 meter. In order to establish the NFC communications 201 to 203, various items of information (for example, an IP address, an SSID, and the like) for setting communication are not necessary. The wireless LAN communications 211 to 213 and 220 are communication in which a communication range is larger than the NFC communications 201 to 203. Communication speeds of the wireless LAN communications 211 to 213 and 220 are higher than communication speeds of the NFC communications 201 to 203. The printer 19 is a unit that executes printing using the image data stored in the memory unit 33. The scanner 20 is a unit that executes reading of documents.

The MFP 52 has the same configuration as the MFP 51, and however, the MFP 52 is not shown in FIG. 1 to simplify the drawing.

<Configuration of First Mobile Phone 8 to Administrator Mobile Phone 10>

The first and second mobile phones 8 and 9 are mobile phones which are used by general users of the MFPs 51 and 52. General users are those who do not have the right to perform various settings on the MFPs 51 and 52 and who are not users performing maintenance of the MFPs 51 and 52. The administrator mobile phone 10 is a mobile phone that is used by an administrator of the MFPs 51 and 52. The administrator is at least one of the user who has the right to perform various settings on the MFPs 51 and 52 and the user who performs maintenance on the MFPs 51 and 52. Further, the administrator mobile phone 10 is a mobile phone that can send the update information described later to the server 71 as a proxy for the first and second mobile phones 8 and 9.

The configuration of the first mobile phone 8 will be described. As shown in FIG. 1, the first mobile phone 8 includes, as its main components, a speaker 3, a microphone 4, a CPU 11, a memory unit 12, a button inputting unit 17, a panel 18, a mobile phone S/R unit 22, a mobile phone antenna unit 23, an NFC S/R unit 24, a wireless S/R unit 25, and a camera unit 27. The CPU 11 executes a program stored in the memory unit 12. These components can communicate with each other via an input/output port 7.

The speaker 3 and the microphone 4 are units for making calls and inputting voice. The first mobile phone ID is stored in the memory unit 12. The first mobile phone ID is information for identifying the first mobile phone 8.

The wireless S/R unit 25 performs wireless LAN communication 211 pursuant to an infrastructure mode of the wireless LAN scheme with the access point 62. The NFC S/R unit 24 performs NFC communication 201 with the MFP 51. The mobile phone S/R unit 22 performs wireless communication according to a mobile phone communication scheme with a base station (not shown) via the mobile phone antenna unit 23. The button inputting unit 17 is a unit that accepts the operations of the user of the first mobile phone 8. The button inputting unit 17 may be integrated with the panel 18 as a touch panel. The panel 18 displays various items of functional information of the first mobile phone 8. The camera unit 27 is a unit that captures an image of a predetermined range using CCDs or the like to acquire image data.

Since the configuration of the second mobile phone 9 and the administrator mobile phone 10 is the same as the configuration of the first mobile phone 8, illustration and description of the detailed configuration thereof are not provided.

<Configuration of Server 71>

Figure 11:
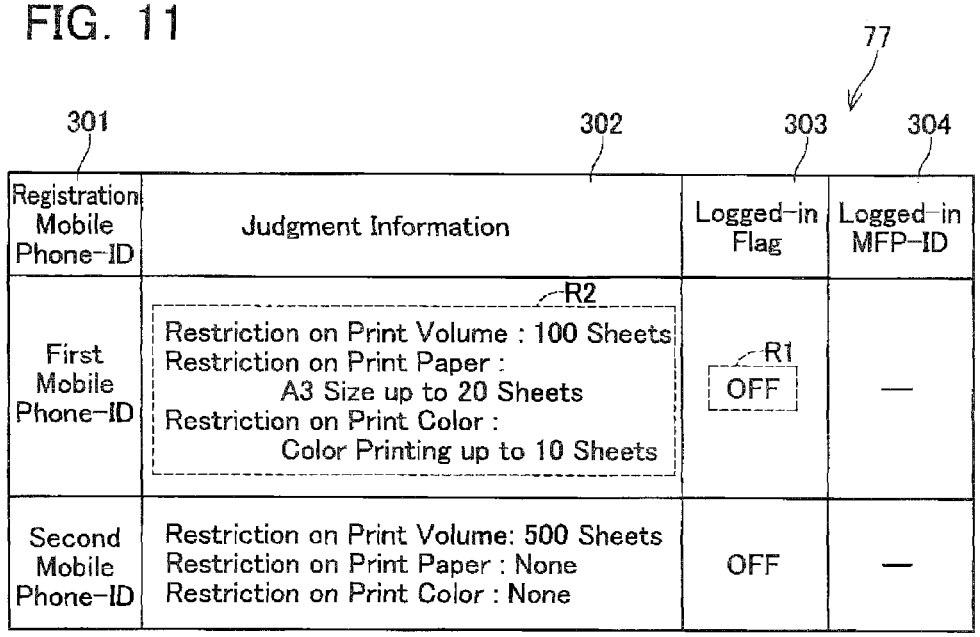
FIG. 11 shows an example of a management table.
Figure 12:
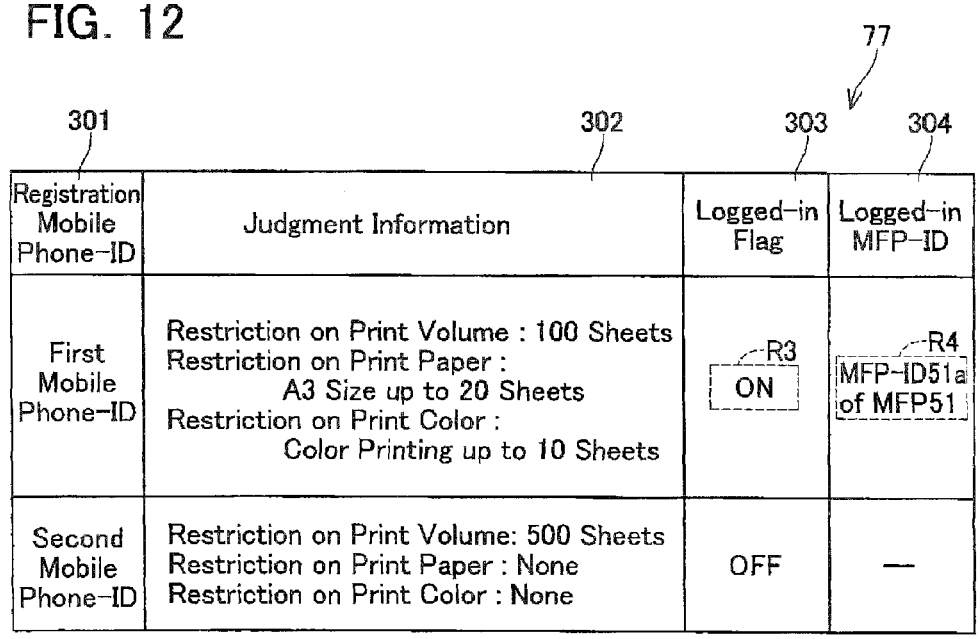
FIG. 12 shows an example of the management table.

The configuration of the server 71 will be described. The server 71 includes, as its main components, a CPU 72, a memory unit 73, and a communication unit 74. These components can communicate with each other via an input/output port 76. The memory unit 73 includes a combination of a RAM, a ROM, a flash memory, a HDD, and the like. Moreover, the memory unit 73 stores a management table 77. FIGS. 11 to 13 show an example of the management table 77. The management table 77 stores a registration mobile phone ID 301, judgment information 302, a logged-in flag 303, and a logged-in MFP-ID 304. The registration mobile phone ID 301 is a mobile phone ID of a mobile phone which is registered as a subject of centralized management of the server 71.

In the example of this embodiment, the first mobile phone ID and the second mobile phone ID are stored as the registration mobile phone ID 301.

The judgment information 302 is information for judging whether an MFP can execute printing. Examples of the judgment information include print volume restriction information, print paper restriction information, print color restriction information, and the like. The print volume restriction information is information indicating such restrictions that the user of the first mobile phone ID can perform printing up to 100 sheets and the user of the second mobile phone ID can perform printing up to 500 sheets, for example. The print paper restriction information is information indicating such restrictions that the user of the first mobile phone ID can perform printing on an A3-size paper up to 20 sheets and the user of the second mobile phone ID can perform printing on an A3-size paper up to an unlimited number of sheets, for example. The print color restriction information is information indicating such restrictions that the user of the first mobile phone ID can perform printing up to 10 sheets in a color mode and the user of the second mobile phone ID can perform printing up to an unlimited number of sheets in a color mode, for example.

The logged-in flag 303 is information for identifying a mobile phone that is used by a user being logged-in to the MFP. The logged-in flag 303 corresponding to the registration mobile phone ID 301 of a mobile phone of the user being logged-in to the MFP is set to "ON." The logged-in MFP-ID 304 is information for identifying an MFP to which a mobile phone is being logged in.

Definitions of the wordings "data" and "information" in this description will be described. "Data" means data itself which is used by a CPU of an MFP or a mobile phone. "Information" is information which is used by a CPU when making various judgments and means conceptual information when data is provided to the CPU as a medium rather than the data itself. In this description, "data" and "information" are explicitly distinguished and used as described above. For example, although "data" that is sent by a data sending device (for example, the first mobile phone 8) and "data" that is stored by a data receiving device (for example, the MFP 51) that receives the data have different contents, both data may represent the same "information." As a specific example, the first mobile phone 8 may send judgment information "inability to perform color printing" as "data" of one byte, and the MFP 51 having received the data may convert the data into "data" of 10 bytes representing "inability to perform color printing" and store the same in the memory unit 33.

<Operation of MFP>

The operation associated with the NFC communication performed by the MFP 51 will be described with reference to FIGS. 2 to 6. The operation performed by the MFP 52 is the same as the operation described below. When the MFP 51 is powered on, the process shown in the flowchart of FIG. 2 starts. In S112 of FIG. 2, the CPU 32 judges whether an access is realized by NFC communications 201 to 203. The access by the NFC communications 201 to 203 starts when the first mobile phone 8, the second mobile phone 9, and the administrator mobile phone 10 approach within a predetermined range around the NFC S/R unit 36. The predetermined range may be approximately 10 cm, for example. When the access is not realized by NFC communication (S112: NO), the flow returns to S112. When the access is realized by NFC communication (S112: YES), the flow proceeds to S113.

In S113, the CPU 32 receives a mobile phone ID of a mobile phone of the NFC communication destination. In S114, the CPU 32 judges whether the mobile phone of the NFC communication destination is the administrator mobile phone 10. The judgment may be performed based on whether the mobile phone ID of the mobile phone of the NFC communication destination is identical to the administrator mobile phone ID stored in the memory unit 33. When the access is made from the administrator mobile phone 10 (S114: YES), the flow proceeds to S116. In S116, the CPU 32 judges whether the update information of the first mobile phone 8 or the update information of the second mobile phone 9 is stored in the memory unit 33. When the update information is not stored (S116: NO), the flow returns to S112. When the update information is stored (S116: YES), the flow proceeds to S118. In S118, the CPU 32 executes an MFP return process. The content of the MFP return process will be described later.

On the other hand, when it is judged in S114 that the mobile phone of the NFC communication destination is not the administrator mobile phone 10 (S114: NO), the flow proceeds to S120. In S120, the CPU 32 judges whether the mobile phone of the NFC communication destination is a mobile phone being logged-in to the MFP 51. The judgment may be made based on whether the mobile phone ID of the mobile phone of the NFC communication destination is stored in the memory unit 33 in association with the log-in flag. When the mobile phone of the NFC communication destination is a logged-in mobile phone (S120: YES), the flow proceeds to S122.

In S122, the CPU 32 judges whether the mobile phone logs out. For example, a logout button which is a button for accepting an input that instructs execution of log-out is displayed on the panel 39, and it may be judged whether the logout button is touched on. When the mobile phone does not log out (S122: NO), the flow returns to S112. When the mobile phone logs out (S122: YES), the flow proceeds to S124.

In S124, the CPU 32 judges whether the update information of the mobile phone of the NFC communication destination is stored in the memory unit 33. When the update information is not stored (S124: NO), the flow returns to S112. When the update information is stored (S124: YES), the flow proceeds to S126. In S126, the CPU 32 executes the MFP return process. The content of the MFP return process will be described later. After that, the flow returns to S112.

Figure 3:
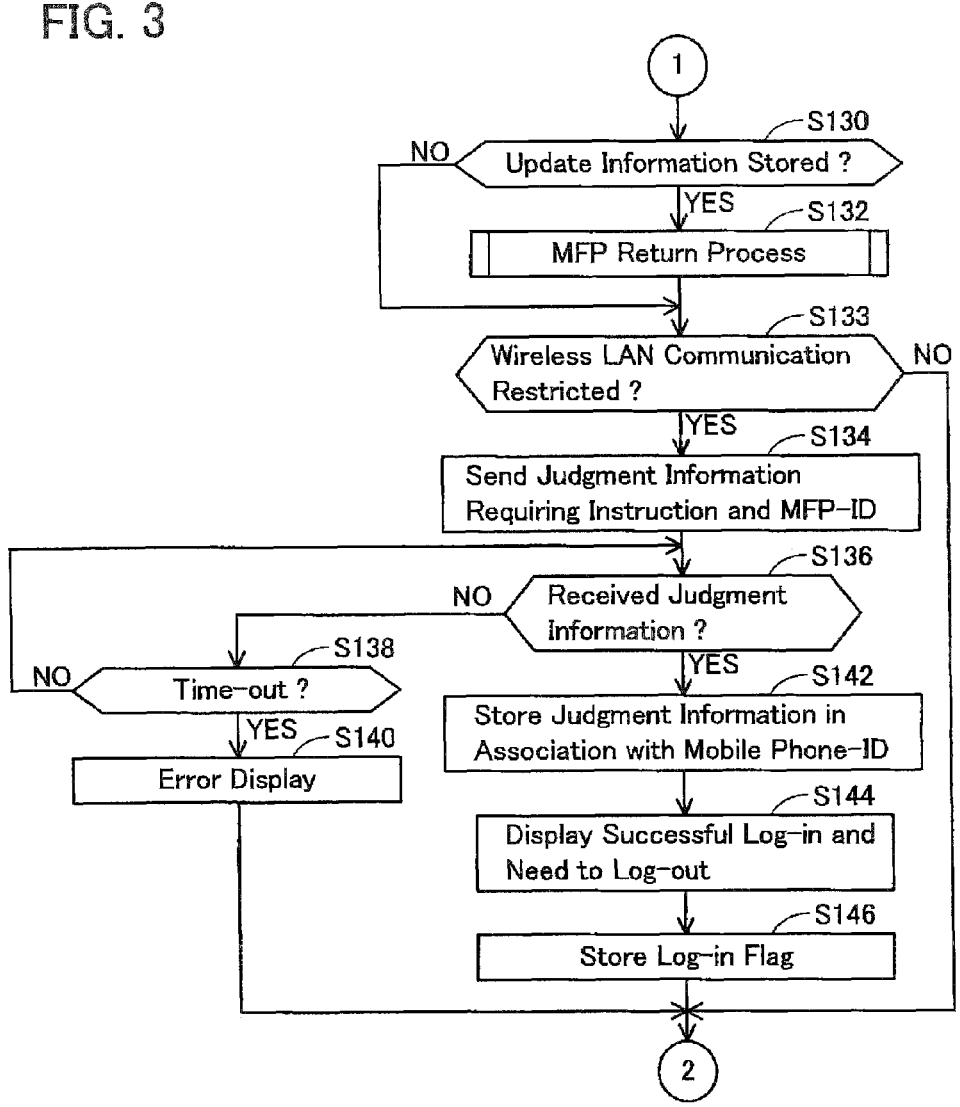
FIG. 3 shows an operational flowchart of the MFP.

On the other hand, when it is judged in S120 that the mobile phone of the NFC communication destination is not logged in to the MFP 51 (S120: NO), the flow proceeds to S128. In S128, the CPU 32 judges whether another mobile phone other than the mobile phone of the NFC communication destination is logged in to the MFP 51. The judgment may be made based on whether the mobile phone ID of the other mobile phone is stored in the memory unit 33 in association with the log-in flag. When the other mobile phone is logged in (S128: YES), the flow proceeds to S129. In S129, the CPU 32 displays an error message on the panel 39, indicating that it is not possible to log in to the mobile phone of the NFC communication destination since the other mobile phone is logged in. As a result, since it is possible to restrict the number of mobile phones that can log in to the MFP 51 to one, it is possible to prevent multiple logins. On the other hand, when the other mobile phone is not logged in (S128: NO), the flow proceeds to S130 (FIG. 3).

In S130, the CPU 32 judges whether the update information of any mobile phone is stored in the memory unit 33. When the update information is not stored (S130: NO), the flow proceeds to S133. When the update information is stored (S130: YES), the flow proceeds to S132. In S132, the CPU 32 executes the MFP return process. The content of the MFP return process will be described later.

In S133, the CPU 32 judges whether wireless LAN communication is restricted. The judgment is made based on whether wireless LAN restriction information is stored in the memory unit 33. When the wireless LAN communication is not restricted (S133: NO), the flow returns to S112. As a result, when the wireless LAN communication is not restricted, it is possible to perform control so that the MFP 51 does not receive the judgment information stored in the server 71. Thus, it is possible to prevent the judgment information, that is stored in the server 71 and received by the MFP 51, from being unnecessarily sent via a wireless LAN. Moreover, when the wireless LAN communication is restricted (S133: YES), the flow proceeds to S134.

In S134, the CPU 32 sends judgment information requesting instruction information and the MFP-ID to the mobile phone of the NFC communication destination. The judgment information requesting instruction information is information indicating a request for the judgment information on the mobile phone of the NFC communication destination. the MFP-ID is read from the memory unit 33. In S136, the CPU 32 judges whether the judgment information on the mobile phone of the NFC communication destination is received from the mobile phone of the NFC communication destination. When the judgment information is not received (S136: NO), the flow proceeds to S138. In S138, the CPU 32 judges whether a time-out event has occurred. The judgment on the occurrence of the time-out event may be made based on whether a predetermined period of time has elapsed after the judgment information requesting instruction information is sent in S134. When the time-out event has not occurred (S138: NO), the flow returns to S136. When the time-out event has occurred (S138: YES), the flow returns to S140. In S140, the CPU 32 displays an error message on the panel 39, indicating that the time-out event has occurred. After that, the flow returns to S112.

On the other hand, when the judgment information on the mobile phone of the NFC communication destination is received in S136 (S136: YES), the flow proceeds to S142. In S142, the CPU 32 stores the received judgment information in the memory unit 33 in association with the mobile phone ID of the mobile phone of the NFC communication destination.

In S144, the CPU 32 displays a message on the panel 39, indicating that the mobile phone of the NFC communication destination has successfully logged in to the MFP 51 and needs to log out after executing the printing process. In S146, the CPU 32 stores the log-in flag in the memory unit 33 in association with the mobile phone ID of the mobile phone of the NFC communication destination. As a result, the fact that the mobile phone of the NFC communication destination is logged in to the MFP 51 is stored in the MFP 51. After that, the flow returns to S112.

Figure 4:
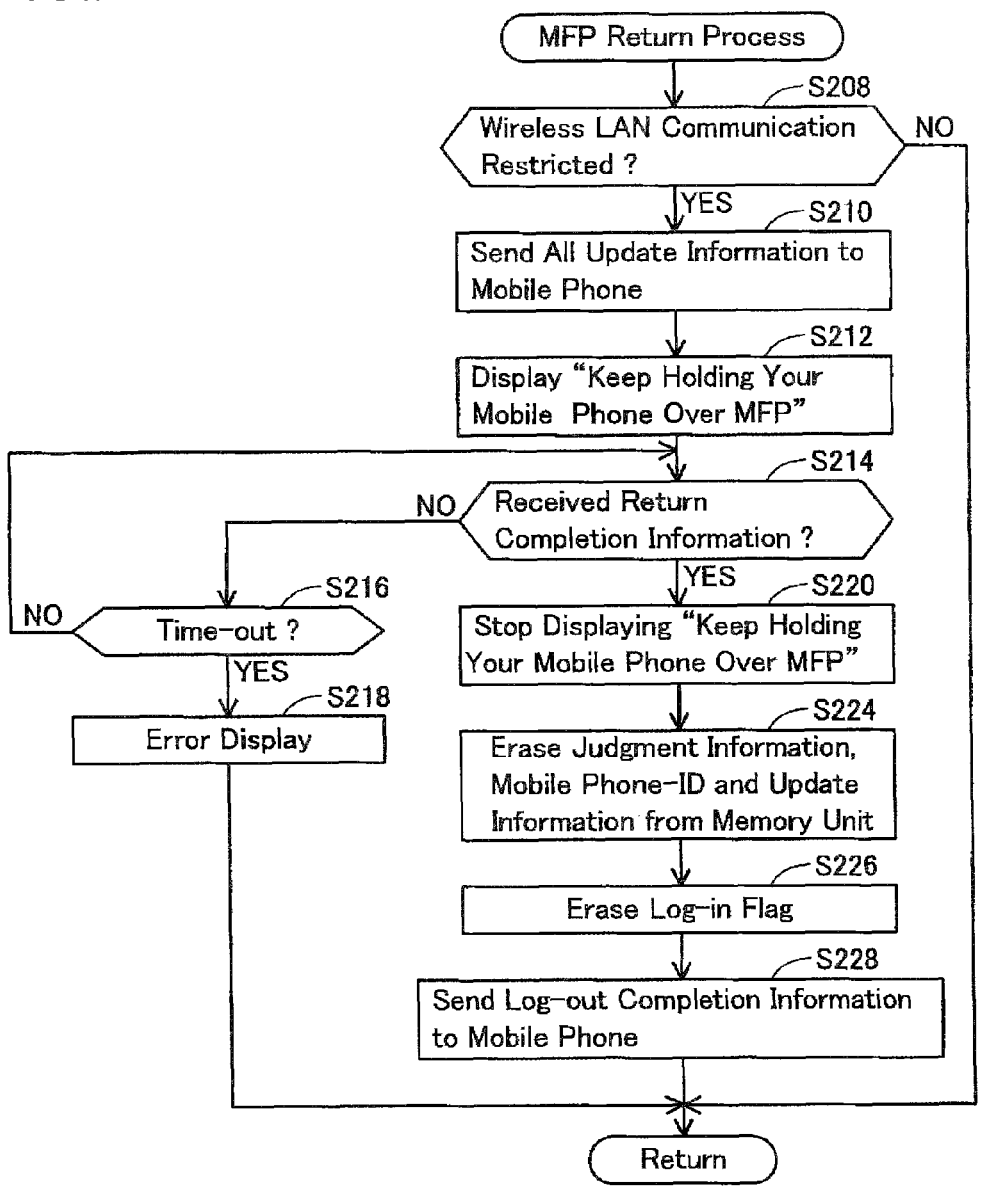
FIG. 4 shows an operational flowchart of the MFP.

The MFP return process will be described with reference to the flowchart of FIG. 4. The MFP return process is a process that starts in S118, S126, and S132. In S208, the CPU 32 judges whether wireless LAN communication is restricted. The judgment is made based on whether wireless LAN restriction information is stored in the memory unit 33. When the wireless LAN communication is not restricted (S208: NO), the flow ends. When the wireless LAN communication is restricted (S208: YES), the flow proceeds to S210.

In S210, the CPU 32 sends all items of update information stored in the memory unit 33 to the mobile phone of the NFC communication destination using NFC communication. In this case, the update information is sent together with the corresponding mobile phone ID. In S212, the CPU 32 displays a message that instructs the user to maintain the NFC communication state. For example, a character string "Keep holding your mobile phone over the MFP" may be displayed on the panel 39. In S214, the CPU 32 judges whether return completion information is received from the mobile phone. The return completion information is information indicating that the update information has been sent to the server 71. When the return completion information is not received (S214: NO), the flow proceeds to S216.

In S216, the CPU 32 judges whether a time-out event has occurred. The judgment on occurrence of the time-out event may be made based on whether a predetermined period of time has elapsed after the update information is sent to the mobile phone in S210. When the time-out event has not occurred (S216: NO), the flow returns to S214. When the time-out even has occurred (S216: YES), the flow proceeds to S218. In S218, the CPU 32 displays an error message on the panel 39, indicating that the time-out event has occurred. After that, the flow ends.

On the other hand, when the return completion information is received in S214 (S214: YES), the flow proceeds to S220. In S220, the CPU 32 stops displaying the character string that was displayed in S212 on the panel 39. In S224, the CPU 32 erases the update information sent to the mobile phone of the NFC communication destination from the memory unit 33. In S226, when the judgment information and the log-in flag of the mobile phone corresponding to the update information erased from the memory unit 33 are stored in the memory unit 33, the CPU 32 erases the judgment information and the log-in flag stored in the memory unit 33 from the memory unit 33. In S228, the CPU 32 sends log-out completion information to the mobile phone of the NFC communication destination, indicating that all mobile phones have logged out. After that, the flow ends.

Figure 5:
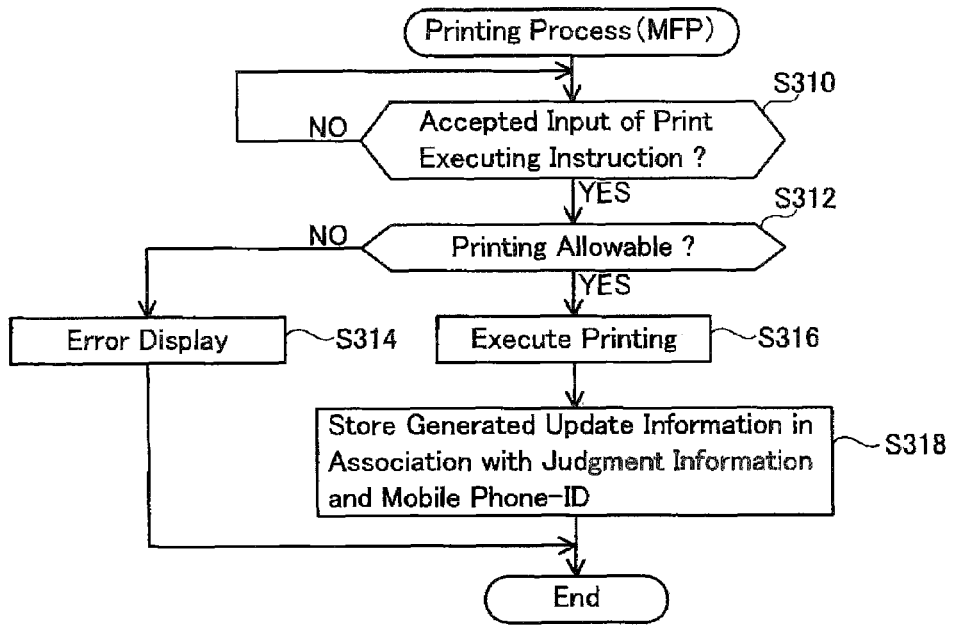
FIG. 5 shows an operational flowchart of the MFP.

The printing process performed by the MFP 51 will be described with reference to FIG. 5. The printing process is a process that is performed in parallel with the processes of FIGS. 2 to 4. When the MFP 51 is powered on, the printing process starts. In S310, the CPU 32 judges whether the input of a print executing instruction has been accepted. For example, a print executing button may be displayed on the panel 39, and the input of the print executing instruction may be accepted when the print executing button is touched on. When the print executing instruction is not accepted (S310: NO), the flow returns to S310. When the print executing instruction is accepted (S310: YES), the flow proceeds to S312.

In S312, the CPU 32 judges whether printing can be allowed for the user of the mobile phone that is logged in to the MFP 51. The judgment may be made using the judgment information on the logged-in mobile phone. Specifically, when the judgment information indicates that printing of up to 10 sheets is allowed, printing up to 10 sheets or less is allowed, and printing 11 sheets or more is not allowed. When printing is not allowed (S312: NO), the flow proceeds to S314, and the CPU 32 displays an error message on the panel 39, indicating that printing cannot be executed. After that, the flow ends. On the other hand, when it is judged that printing is allowed (S312: YES), the flow proceeds to S316. In S316, the CPU 32 executes printing on the printer 19 using the image data stored in the memory unit 33. The printing in S316 may be performed using the judgment information on the logged-in mobile phone and the update information that is generated according to the print execution content. As a specific example, printing of 5 sheets is allowed in the first printing operation, and when printing of 5 sheets is finished, the update information indicating that 5 sheets have been printed is stored in the memory unit 33 in association with the logged-in mobile phone in S318 described later. Here, a case where for the logged-in mobile phone, the printable volume included in the judgment information indicates that printing of up to 10 sheets is allowed, and the update information indicates that 5 sheets have been printed will be considered. In this case, in the second printing operation, although printing of 5 sheets or less is allowed, printing of 5 sheets or more is not allowed. Moreover, the judgment information of the logged-in mobile phone may be updated according to the print execution content. That is, the printable volume of the logged-in mobile phone may be subtracted by one whenever one sheet is printed, and further printing is not allowed in the points in time when the printable volume reaches 0. As a specific example, a case where the printable volume of the logged-in mobile phone indicates that printing of up to 10 sheets is allowed, and the input of the print executing instruction of 11 sheets is accepted will be considered. In this case, the printable volume is subtracted by one whenever one sheet is printed, and the printable volume reaches 0 when the tenth sheet is printed. Thus, printing of the eleventh and subsequent sheets is not allowed.

In S318, the CPU 32 generates the update information based on print execution results. The generated update information may be the number of printed sheets, for example. The CPU 32 stores the generated update information in the memory unit 33 in association with the judgment information and the mobile phone ID of the logged-in mobile phone. After that, the flow ends.

Figure 6:
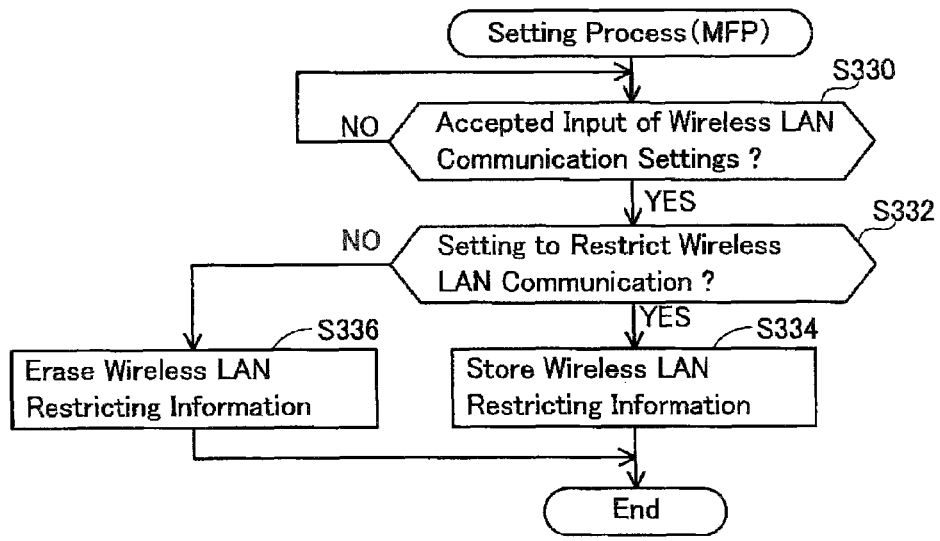
FIG. 6 shows an operational flowchart of the MFP.

A wireless LAN communication setting process performed by the MFP 51 will be described with reference to FIG. 6. The wireless LAN communication setting process is a process that is performed in parallel with the processes of FIGS. 2 to 4. The wireless LAN communication setting process starts when the user of the MFP 51 inputs an instruction to perform a wireless communication setting process via the button 38 or the panel 39. In S330, the CPU 32 judges whether the input of the wireless LAN communication settings is accepted. For example, a setting button may be displayed on the panel 39, and the input of the wireless LAN communication settings may be accepted when the setting button is touched on. When the input of the wireless LAN communication settings is not accepted (S330: NO), the flow returns to S330. When the input of the wireless LAN communication settings is accepted (S330: YES), the flow proceeds to S332.

In S332, the CPU 32 judges whether setting to restrict wireless LAN communication is made. When the setting to restrict wireless LAN communication is made (S332: YES), the flow proceeds to S334. In S334, the CPU 32 stores the wireless LAN restriction information in the memory unit 33. As a result, it is not possible to execute wireless LAN communication between the MFP 51 and the server 71. Thus, it is possible to realize a stand-alone state in which the MFP 51 does not perform wireless LAN communication. As a result, the occurrence of a situation in which information that should not be sent from the MFP 51 is sent via wireless LAN communication, a situation in which information that should not be received by the MFP 51 is received via wireless LAN communication can be prevented. In this case, for the server 71 to manage the judgment information in a centralized manner, it is necessary to execute various communication via the first mobile phone 8, the second mobile phone 9, and the administrator mobile phone 10.

On the other hand, when the setting to restrict wireless LAN communication is not made (S332: NO), the flow proceeds to S336. In S336, the CPU 32 erases the wireless LAN restriction information from the memory unit 33. As a result, it is possible to execute wireless LAN communication between the MFP 51 and the server 71.

<Operation of Mobile Phone>

The operation performed by the first mobile phone 8, the second mobile phone 9, and the administrator mobile phone 10 will be described with reference to FIG. 7. In this embodiment, the operation performed by the first mobile phone 8 will be described as an example. When the first mobile phone 8 is powered on, the process shown in the flowchart of FIG. 7 starts. In S410, the CPU 11 judges whether an access is realized by NFC communication 201. When the access is not realized by the NFC communication 201 (S410: NO), the flow returns to S410. When the access is realized by the NFC communication 201 (S410: YES), the flow proceeds to S411. In S411, the CPU 11 receives the MFP-ID of the MFP of the NFC communication destination.

In S412, the CPU 11 judges whether the update information and the mobile phone ID corresponding to the update information have been received from the MFP. When the update information and the mobile phone ID have not been received (S412: NO), the flow proceeds to S422. When the update information and the mobile phone ID have been received (S412: YES), the flow proceeds to S414. In S414, the CPU 11 executes a mobile phone return process. The content of the mobile phone return process will be described later.

In S422, the CPU 11 judges whether the judgment information requesting instruction information and the MFP-ID have been received from the MFP. When the judgment information requesting instruction information and the MFP-ID have not been received (S422: NO), the flow returns to S410. When the judgment information requesting instruction information and the MFP-ID have been received (S422: YES), the flow proceeds to S424. In S424, the CPU 11 establishes wireless LAN communication 211 with the access point 62. As a result, communication between the first mobile phone 8 and the server 71 is established. In S426, the CPU 11 sends second judgment information requesting instruction information, the first mobile phone ID, and the MFP-ID to the server 71, indicating that the CPU 11 requests the judgment information from the server 71. As a result, a request for the judgment information on the first mobile phone ID is sent to the server 71.

In S428, the CPU 11 judges whether the judgment information on the first mobile phone ID has been received from the server 71. When the judgment information has been received (S428: YES), the flow proceeds to S434. In S434, the CPU 11 sends the judgment information on the first mobile phone ID to the MFP using NFC communication. After that, the flow returns to S410. On the other hand, when it is judged in S428 that the judgment information on the mobile phone ID has not been received (S428: NO), the flow proceeds to S430. In S430, the CPU 11 judges whether a time-out event has occurred. The judgment on occurrence of the time-out event may be made based on whether a predetermined period of time has elapsed after the second judgment information requesting instruction information, the first mobile phone ID, and the MFP-ID have been sent in S426. When the time-out event has not occurred (S430: NO), the flow proceeds to S431. When the time-out event has occurred (S430: YES), the flow returns to S410.

In S431, the CPU 11 judges whether first error information have been received from the server 71. The first error information is information indicating that the first mobile phone 8 is not registered in the server 71 as a registered mobile phone which is a mobile phone that relays the judgment information stored in the server 71 to the MFPs 51 and 52. When the first error information has not been received (S431: NO), the flow proceeds to S432. When the first error information has been received (S431: YES), the flow returns to S410. In S432, the CPU 11 judges whether second error information and a logged-in MFP-ID 304 have been received from the server 71. The second error information is information indicating that a new login is not allowed since the first mobile phone 8 is logged in to the MFP 51 or 52. The logged-in MFP-ID 304 is information for identifying the MFP to which the first mobile phone 8 is logged in. When the second error information and the logged-in MFP-ID 304 have not been received (S432: NO), the flow returns to S428. When the second error information and the logged-in MFP-ID 304 have been received (S432: YES), the flow proceeds to S433. In S433, the CPU 11 displays a message on the panel 18, indicating that the first mobile phone 8 has failed to log in to the MFP that is in the NFC communication since the first mobile phone 8 is logged in to the MFP that is identified by the logged-in MFP-ID 304. After that, the flow returns to S410.

The MFP return process (S414) will be described with reference to the flowchart of FIG. 8. The MFP return process starts in S414. In S510, the CPU 11 displays a message that instructs the user to maintain the NFC communication state. For example, a character string "Keep holding your mobile phone over the MFP" may be displayed on the panel 18.

In S512, the CPU 11 establishes wireless LAN communication 211 to the access point 62. As a result, communication is established between the first mobile phone 8 and the server 71. In S514, the CPU 11 sends the update information received from the MFP 51 in S412, the mobile phone ID corresponding to the update information, the first mobile phone ID, and the MFP-ID to the server 71 using the wireless LAN communication 211.

In S516, the CPU 11 judges whether return completion information indicating that the server 71 has received the update information, the mobile phone ID corresponding to the update information, the first mobile phone ID, and the MFP-ID has been received from the server 71. When the return completion information has not been received (S516: NO), the flow proceeds to S518. In S518, the CPU 11 judges whether a time-out event has occurred. The judgment on occurrence of the time-out event may be made based on whether a predetermined period of time has elapsed after various items of information have been sent to the server 71 in S514. When the time-out event has not occurred (S518: NO), the flow returns to S516. When the time-out event has occurred (S518: YES), the flow proceeds to S519. In S519, the CPU 11 displays an error message on the panel 18, indicating that the time-out event has occurred. After that, the flow ends.

On the other hand, when it is judged in S516 that the return completion information has been received from the server 71 (S516: YES), the flow proceeds to S520. In S520, the CPU 11 sends the return completion information to the MFP using the NFC communication 201. In S522, the CPU 11 judges whether log-out completion information has been received from the MFP. When the log-out completion information has not been received (S522: NO), the flow proceeds to S524. In S524, the CPU 11 judges whether a time-out event has occurred. The judgment on occurrence of the time-out event may be made based on whether a predetermined period of time has elapsed after the return completion information is sent to the MFP in S520. When the time-out event has not occurred (S524: NO), the flow returns to S522. When the time-out event has occurred (S524: YES), the flow proceeds to S526. In S526, the CPU 11 displays an error message on the panel 18, indicating that the time-out event has occurred. After that, the flow ends.

On the other hand, when it is judged in S522 that the log-out completion information has been received from the MFP (S522: YES), the flow proceeds to S528. In S528, the CPU 11 stops displaying the character string that was displayed in S510 on the panel 18. After that, the flow ends.

Figure 7:
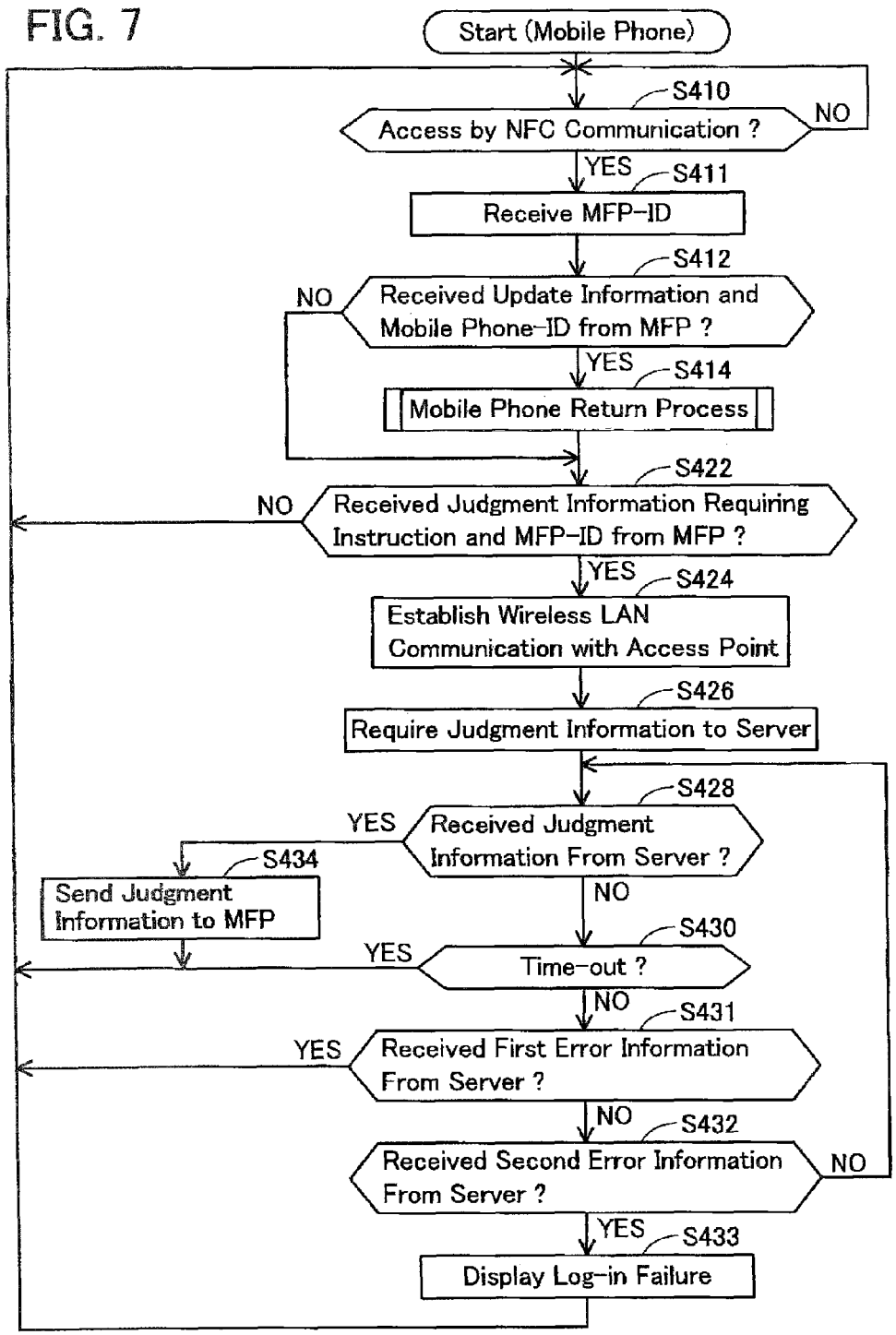
FIG. 7 shows an operational flowchart of a mobile phone.
Figure 8:
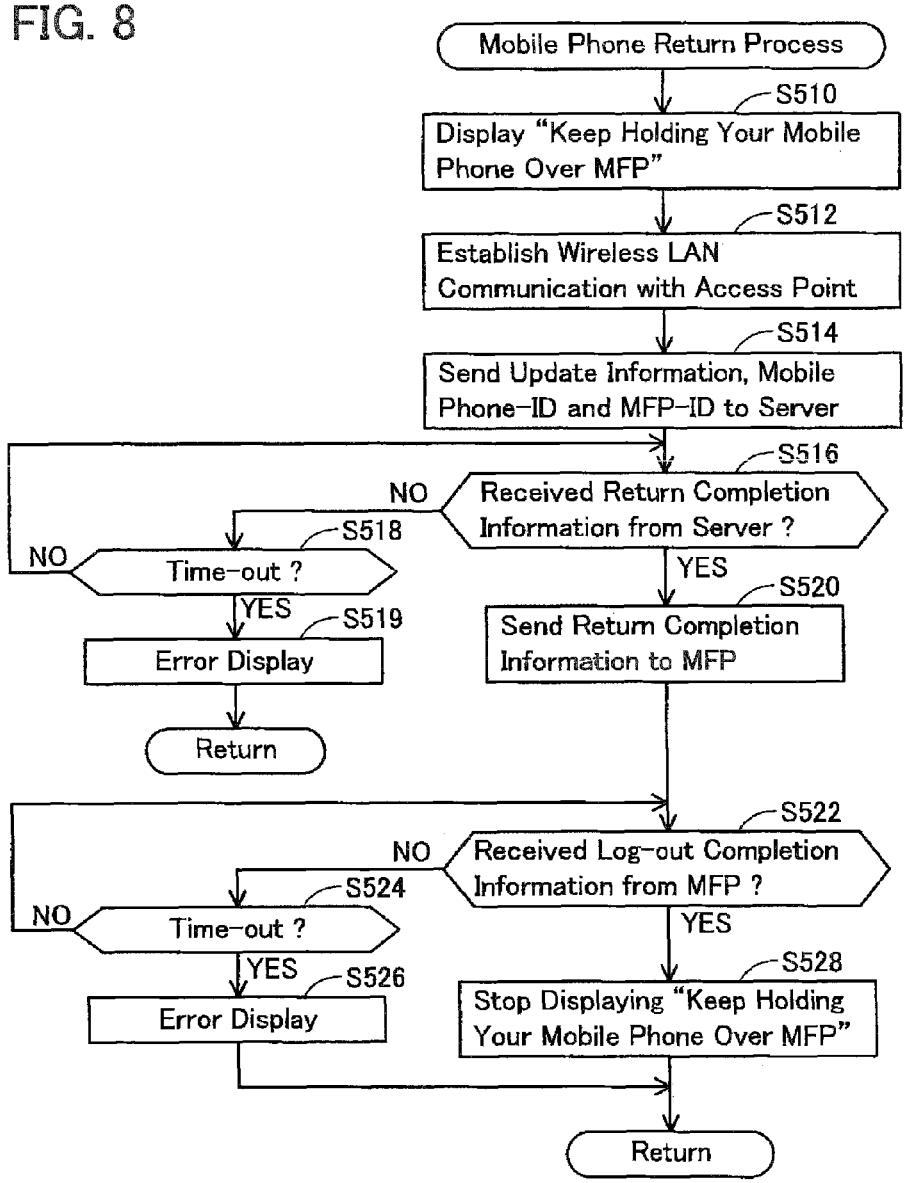
FIG. 8 shows an operational flowchart of the mobile phone.

The processes of FIGS. 7 and 8 performed by the second mobile phone 9 are the same as the processes of FIGS. 7 and 8 performed by the first mobile phone 8. Thus, the description thereof will not be provided.

Figure 9:
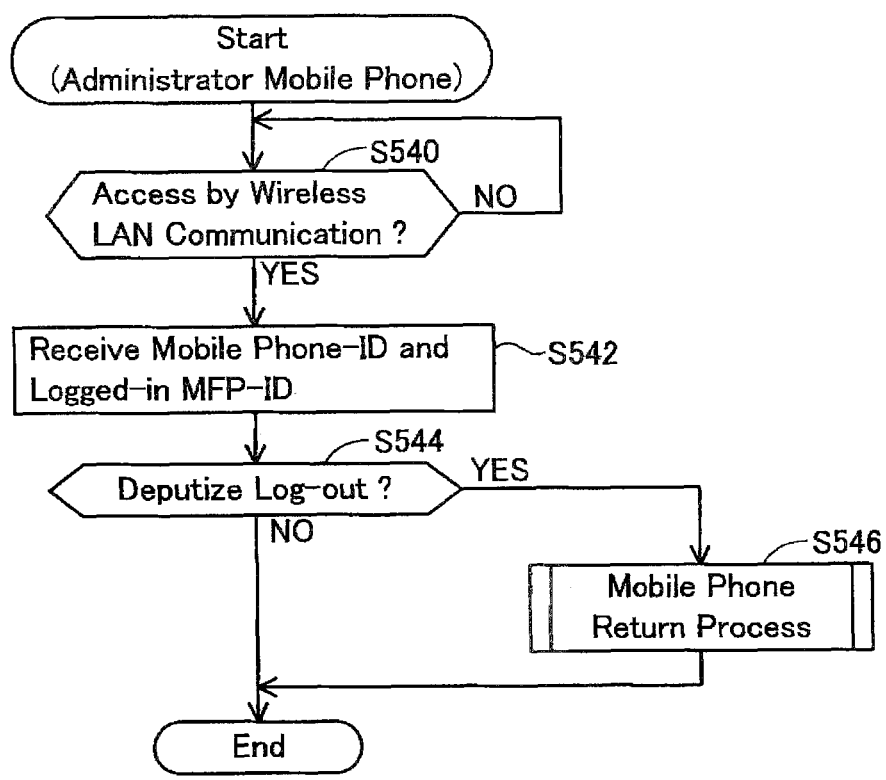
FIG. 9 shows an operational flowchart of the mobile phone.

The operation performed by the administrator mobile phone 10 will be described with reference to FIG. 9. When the administrator mobile phone 10 is powered on, the process shown in the flowchart of FIG. 9 starts. In S540, the CPU of the administrator mobile phone 10 judges whether an access is realized by wireless LAN communication 213. When the access is not realized by the wireless LAN communication 213 (S540: NO), the flow returns to S540. When the access is realized (S540: YES), the flow proceeds to S542. In S542, the CPU of the administrator mobile phone 10 receives the mobile phone ID and the logged-in MFP-ID 304 from the server 71. Moreover, a message indicating that a mobile phone specified by the mobile phone ID is left unused in the state of being logged-in to the MFP that is specified by the logged-in MFP-ID 304 is displayed on the panel of the administrator mobile phone 10.

In S544, the CPU of the administrator mobile phone 10 judges whether the input of an instruction to deputize logout for the mobile phone specified by the mobile phone ID has been accepted. "To deputize" herein means to function as a proxy. For example, "to deputize logout" means to perform the logout process as a proxy for the mobile phone that had logged in. For example, a logout deputizing button may be displayed on the panel, and the input of the instruction to deputize logout may be accepted when the administrator touches on the logout deputizing button. When the input of the instruction to deputize logout is accepted (S544: YES), the flow proceeds to S546. In S546, a character string that instructs to initiate NFC communication between the MFP that is indicated by the MFP-ID 304 received from the server 71 and the administrator mobile phone 10 is displayed on the panel 39 in order to deputize logout. Specifically, a character string "Please log out user xxx by holding the phone over MFP xxx" is displayed on the panel 39. When the administrator having seen the character string holds the administrator mobile phone 10 over the MFP, logout of the mobile phone that is specified by the mobile phone ID received from the server 71 is executed. On the other hand, when the instruction to deputize logout is not accepted (S544: NO), the flow ends.

<Operation of Server>

Figure 10:
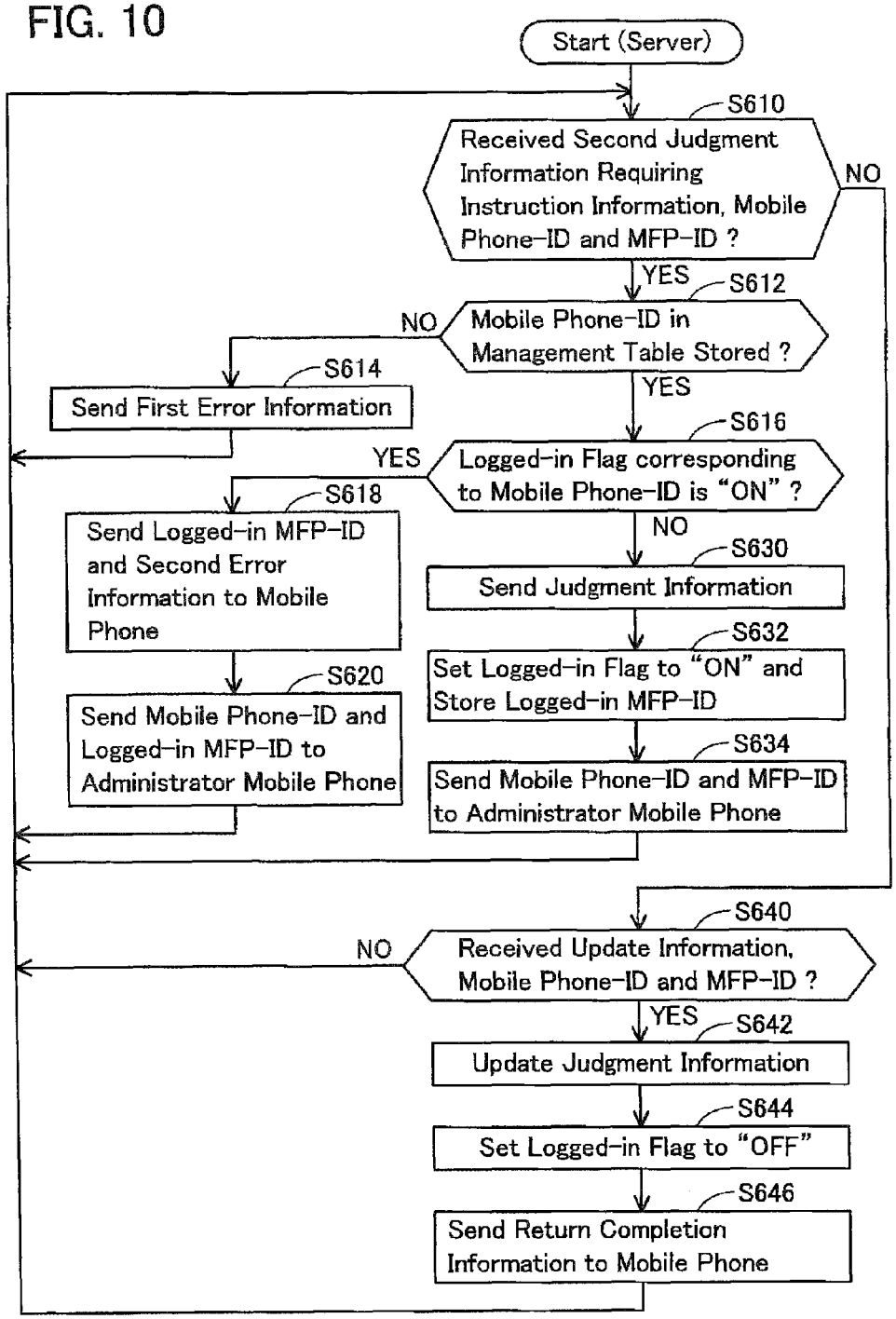
FIG. 10 shows an operational flowchart of a server.

The operation performed by the server 71 will be described with reference to FIG. 10. When the server 71 is powered on, the process shown in the flowchart of FIG. 10 starts. In S610, the CPU 72 judges whether the second judgment information requesting instruction information, the mobile phone ID, and the MFP-ID have been received. When the second judgment information requesting instruction information, the mobile phone ID, and the MFP-ID have been received (S610: YES), it is judged that it is requested to acquire the judgment information, and the flow proceeds to S612.

In S612, the CPU 72 judges whether the received mobile phone ID is an ID that is included in the registration mobile phone ID 301 stored in the management table 77. When the mobile phone ID is stored (S612: YES), the flow proceeds to S616. When the mobile phone ID is not stored (S612: NO), the flow proceeds to S614. If the received mobile phone ID is not included in the registration mobile phone ID 301 stored in the management table 77, it means that the mobile phone corresponding to the mobile phone ID is not registered in the server 71 as a registered mobile phone which is a mobile phone that relays the judgment information stored in the server 71 to the MFPs 51 and 52. In S614, the CPU 72 sends the first error information to the mobile phone of the wireless LAN communication destination. After that, the flow returns to S610.

In S616, the CPU 72 judges whether the logged-in flag 303 corresponding to the mobile phone ID received in S610 is "ON" in the management table 77. When the logged-in flag 303 is "ON" (S616: YES), it is judged that the mobile phone that has issued the request to acquire the judgment information is logged in to another MFP, and the flow proceeds to S618. In S618, the CPU 72 sends the logged-in MFP-ID 304 corresponding to the mobile phone ID received in S610 and second error information to the mobile phone of the wireless LAN communication destination. The second error information is information indicating that a request for a new login is not allowable since the mobile phone corresponding to the mobile phone ID received in S610 is logged in to the MFP 51 or 52. In S620, the CPU 72 sends the mobile phone ID received in S610 and the logged-in MFP-ID 304 corresponding to the mobile phone ID received in S610 to the administrator mobile phone 10. After that, the flow returns to S610.

On the other hand, when it is judged in S616 that the logged-in flag 303 corresponding to the mobile phone ID received in S610 is not "ON" (S616: NO), the flow proceeds to S630. In S630, the CPU 72 reads the judgment information 302 corresponding to the mobile phone ID received in S610 from the management table 77 and sends the judgment information 302 to the mobile phone that has sent the judgment information acquisition request. In S632, the CPU 72 sets the logged-in flag 303 in the management table 77, corresponding to the mobile phone ID received in S610, to "ON" and stores the MFP-ID received in S610 in association with the mobile phone ID received in S610 as the logged-in MFP-ID 304. In S634, the CPU 72 sends the mobile phone ID and the MFP-ID received in S610 to the administrator mobile phone 10. As a result, information on which mobile phone has logged in to which MFP is notified to the administrator.

On the other hand, when it is judged in S610 that the mobile phone ID and the MFP-ID have not been received (S610: NO), the flow proceeds to S640. In S640, the CPU 72 judges whether the update information, the mobile phone ID corresponding to the update information, the mobile phone ID of the destination mobile phone, and the MFP-ID have been received. When these items of information have not been received (S640: NO), the flow returns to S610. When these items of information have been received (S640: YES), the flow proceeds to S642.

In S642, the CPU 72 retrieves the registration mobile phone ID 301 from the management table 77. The registration mobile phone ID 301 is information corresponding to "the mobile phone ID corresponding to the update information" received in S640. Moreover, the CPU 72 updates the judgment information 302 corresponding to the retrieved registration mobile phone ID 301 using the update information received in S640. In S644, the CPU 72 sets the logged-in flag 303 corresponding to the retrieved registration mobile phone ID 301 to "OFF." That is, the update information, the mobile phone ID, and the MFP-ID received from the mobile phone also serve as the information indicating that the mobile phone corresponding to the mobile phone ID has logged out of the MFP. In S646, the CPU 72 sends the return completion information to the mobile phone. After that, the flow returns to S610.

<First Operation Example of Printing System>

Figure 14:
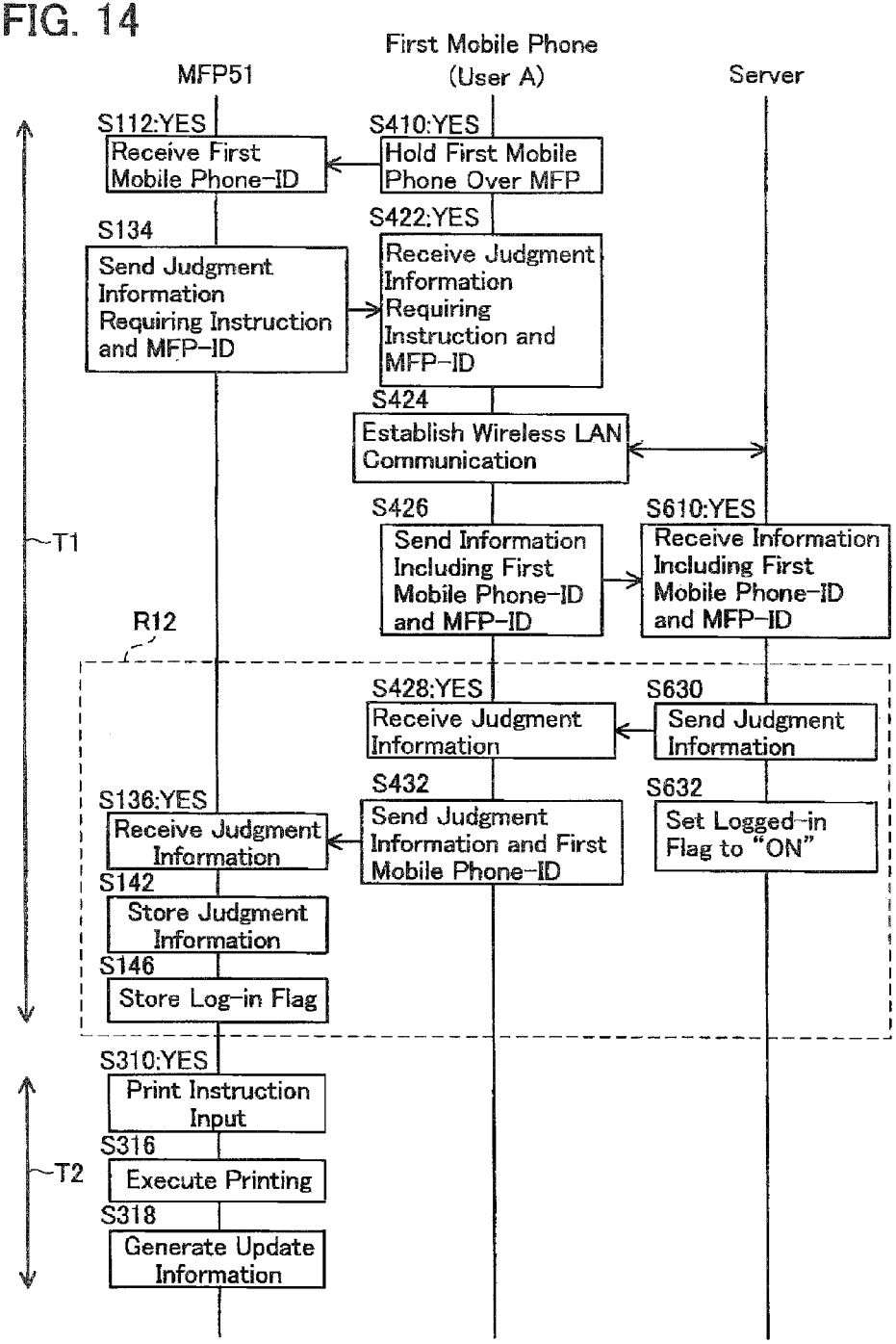
FIG. 14 shows a sequence diagram of a printing system.
Figure 15:
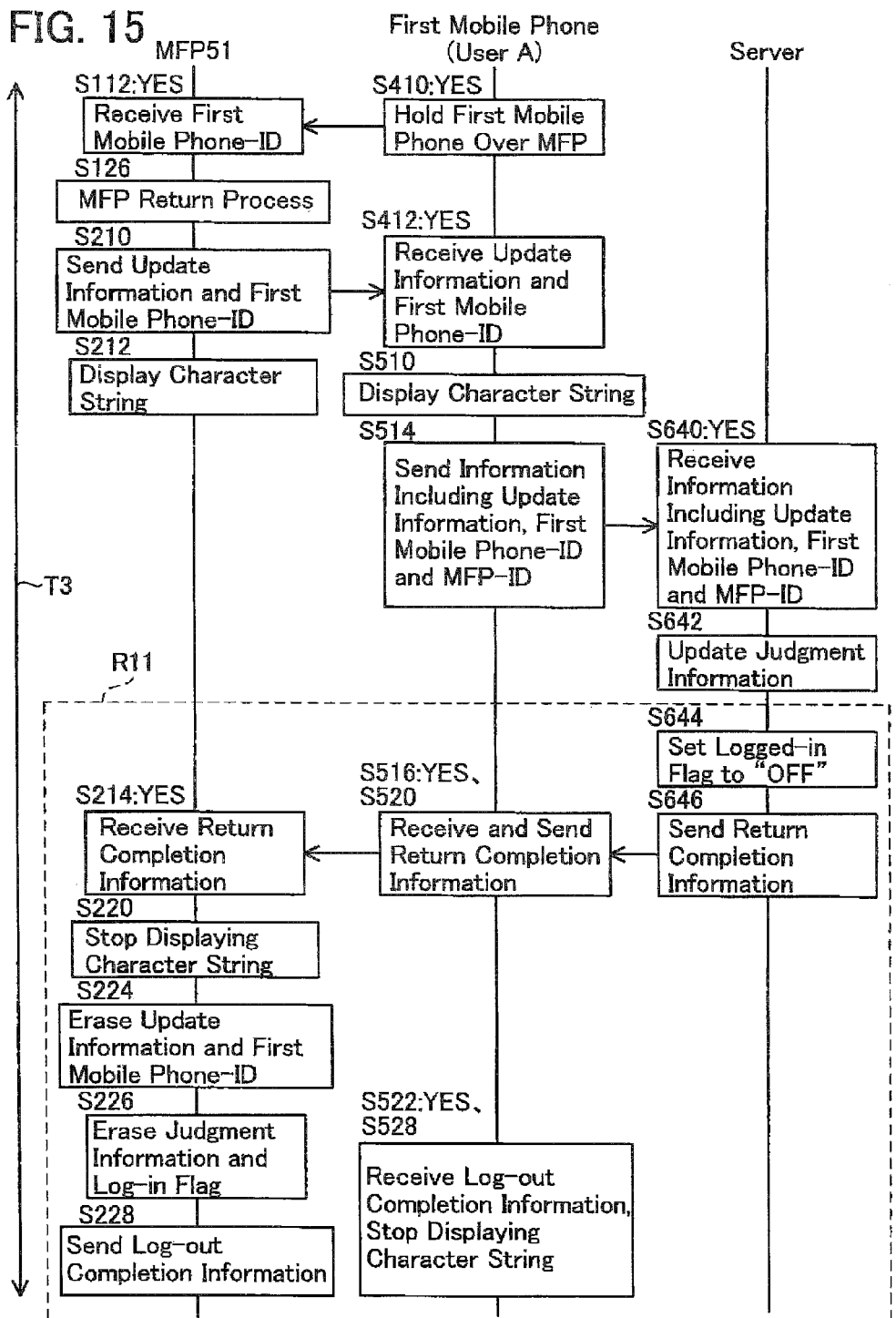
FIG. 15 shows a sequence diagram of the printing system.

A first operation example of the printing system 1 will be described with reference to the flowcharts of FIGS. 14 and 15.

In the first operation example, a series of operations until user A who is the user of the first mobile phone 8 logs out after logging in to the MFP 51 and executing printing will be described. A case where wireless LAN restriction information is stored in the memory unit 33, and wireless LAN communication cannot be executed will be described as an example. Moreover, a case where the management table 77 in the state shown in FIG. 11 is stored in the server 71 will be described as an example. Further, a case where the first mobile phone 8 is the mobile phone possessed by the user A will be described as an example. Furthermore, a case where no update information is stored in the memory unit 33 will be described as an example.

The operation during a period T1 will be described. The period T1 is a period that ends when the first mobile phone 8 logs in to the MFP 51. When the user A holds the first mobile phone 8 over the MFP 51, the first mobile phone 8 accesses by the NFC communication 201 (S410: YES). Since the access is realized by the NFC communication 201 (S112: YES), the MFP 51 receives the first mobile phone ID of the first mobile phone 8 of the NFC communication destination (S113). In this state, the first mobile phone 8 of the NFC communication destination is not the administrator mobile phone 10 (S114: NO), the first mobile phone 8 is not logged in to the MFP 51 (S120: NO), no update information is stored in the memory unit 33 (S130: NO), and the wireless LAN communication is restricted (S133: YES). Thus, the MFP 51 sends judgment information requesting instruction information and a MFP-ID 51a to the first mobile phone 8 (S134).

Upon receiving the judgment information requesting instruction information and the MFP-ID 51a from the MFP 51 (S422: YES), the first mobile phone 8 establishes wireless LAN communication 211 with the access point 62 (S424). The first mobile phone 8 sends second judgment information requesting instruction information, the first mobile phone ID, and the MFP-ID 51a to the server 71 (S426).

The server 71 receives the second judgment information requesting instruction information, the first mobile phone ID, the MFP-ID 51a from the first mobile phone 8 (S610: YES). Since the first mobile phone ID received is included in the registration mobile phone ID 301 that is stored in the management table 77 (see FIG. 11) (S612: YES), it is judged that the first mobile phone 8 is the subject of the centralized management of the server 71. Since the logged-in flag 303 corresponding to the first mobile phone ID is "OFF" (S616: NO) (see region R1 in FIG. 11), it is judged that the first mobile phone 8 is not logged in to any of the MFPs. The judgment information 302 corresponding to the first mobile phone 8 is read from the management table 77 (see region R2 in FIG. 11) and sent to the first mobile phone 8 (S630). The server 71 sets the logged-in flag 303 in the management table 77, corresponding to the first mobile phone ID to "ON" (see region R3 in FIG. 12) and stores the MFP-ID 51a received in S610 as the logged-in MFP-ID 304 (see region R4 in FIG. 12) (S632).

Upon receiving the judgment information on the first mobile phone ID from the server 71 (S428: YES), the first mobile phone 8 sends the first mobile phone ID and the judgment information on the first mobile phone ID to the MFP 51 (S434).

Upon receiving the judgment information on the first mobile phone 8 from the first mobile phone 8 (S136: YES), the MFP 51 stores the received judgment information in the memory unit 33 in association with the first mobile phone ID (S142). The MFP 51 displays a message on the panel 38, indicating that the first mobile phone 8 has successfully logged in to the MFP 51 and needs to log out after executing the printing process (S144). The MFP 51 stores the log-in flag in the memory unit 33 in association with the first mobile phone ID (S146).

The operation during a period T2 will be described. The period T2 is a period in which the MFP 51 executes printing. When the user A operates the button inputting unit 38 to input print instruction information (S310: YES), the MFP 51 judges whether printing can be allowed (S312). The judgment information on the first mobile phone 8 includes "print volume restriction: 100 sheets, print paper restriction: A3 size up to 20 sheets, and print color restriction: color printing up to 10 sheets." Moreover, update information is not yet stored. Thus, printing of the user A is allowed (S312: YES), and printing is executed (S316).

In the period during when the printing in S316 is executed, the judgment information stored in the memory unit 33 is updated according to the print execution content. For example, the number of sheets indicated by the print color restriction in the judgment information is decreased by one whenever the user A executes color printing. Moreover, the print color restriction in the judgment information is updated to "color printing inhibited" at the point in time when the user A has finished color printing of 10 sheets. In this case, the user A cannot perform color printing any more. Further, the number of sheets indicated by the print paper restriction in the judgment information is decreased by one whenever the user A executes printing on A3-size paper. Moreover, the print paper restriction in the judgment information is updated to "A3-size printing inhibited" at the point in time when the user A has finished printing on 20 sheets of A3-size paper. In this case, since the user A cannot perform printing on A3-size paper any more, it is necessary to switch to printing of another size (for example, A4-size) in order to continue printing.

When printing ends, the MFP 51 generates update information (S318). For example, when the user A has executed color printing on 5 sheets of A3-size paper, update information having such content that "print volume=5 sheets, paper size=A3, and print color=color" is generated. The generated update information is associated with the judgment information of the first mobile phone 8 and the first mobile phone ID and stored in the memory unit 33.

The operation during a period T3 will be described with reference to FIG. 15. The period T3 is a period that ends when the first mobile phone logs out of the MFP 51. When the user A holds the first mobile phone 8 over the MFP 51, the first mobile phone 8 realizes an access by NFC communication 201 (S410: YES). Since the access is realized by the NFC communication 201 (S112: YES), the MFP 51 receives the first mobile phone ID of the first mobile phone 8 of the NFC communication destination (S113). In this state, the first mobile phone 8 is logged in to the MFP 51 (S120: YES), the user A has touched on the logout button (S122: YES), and the update information on the first mobile phone 8 of the NFC communication destination is stored in the memory unit 33 (S124: YES). Thus, the MFP 51 executes the MFP return process (S126).

Since the wireless LAN communication is restricted (S208: YES), the MFP 51 sends the update information stored in the memory unit 33 and the first mobile phone ID corresponding to the update information to the first mobile phone 8 (S210). The MFP 51 displays a character string "Keep holding your mobile phone over the MFP" on the panel 39 (S212).

Upon receiving the update information and the first mobile phone ID corresponding to the update information from the MFP 51 (S412: YES), the first mobile phone 8 executes the mobile phone return process (S414). The first mobile phone 8 displays a character string "Keep holding your mobile phone over the MFP" on the panel 18 (S510) and establishes communication with the server 71 (S512). The first mobile phone 8 sends the update information, the first mobile phone ID corresponding to the update information, the first mobile phone ID of the destination mobile phone, and the MFP-ID 51*a* to the server 71 (S514).

Upon receiving the update information, the first mobile phone ID corresponding to the update information, the first mobile phone ID of the first mobile phone 8 of the destination, and the MFP-ID 51*a* from the first mobile phone 8 (S640: YES), the server 71 updates the judgment information 302 of the first mobile phone 8 corresponding to the update information using the received update information (S642). For example, when the update information includes "print volume=5 sheets, paper size=A3, and print color=color", the judgment information of the first mobile phone 8 is updated to "print volume restriction: 95 sheets, print paper restriction: A3-size up to 15 sheets, and print color restriction: color printing up to 5 sheets" (see region R5 in FIG. 13). The server 71 sets the logged-in flag 303 corresponding to the first mobile phone 8 to "OFF" (S644) (see region R6 in FIG. 13). The server 71 sends return completion information to the first mobile phone 8 (S646).

Upon receiving the return completion information from the server 71 (S516: YES), the first mobile phone 8 sends the return completion information to the MFP 51 (S520). Upon receiving the return completion information (S214: YES), the MFP 51 stops displaying the character string "Keep holding your mobile phone over the MFP" on the panel 39 (S220). The MFP 51 erases the update information of the first mobile phone 8 and the first mobile phone ID from the memory unit 33 (S224). The MFP 51 erases the judgment information and the log-in flag of the first mobile phone 8 from the memory unit 33 (S226). The MFP 51 sends log-out completion information to the first mobile phone 8 to inform that logout has been completed (S228).

Upon receiving the log-out completion information from the MFP 51 (S522: YES), the first mobile phone 8 stops displaying the character string "Keep holding a mobile phone over the MFP" on the panel 18 (S528).

<Second Operation Example of Printing System>

Figure 16:
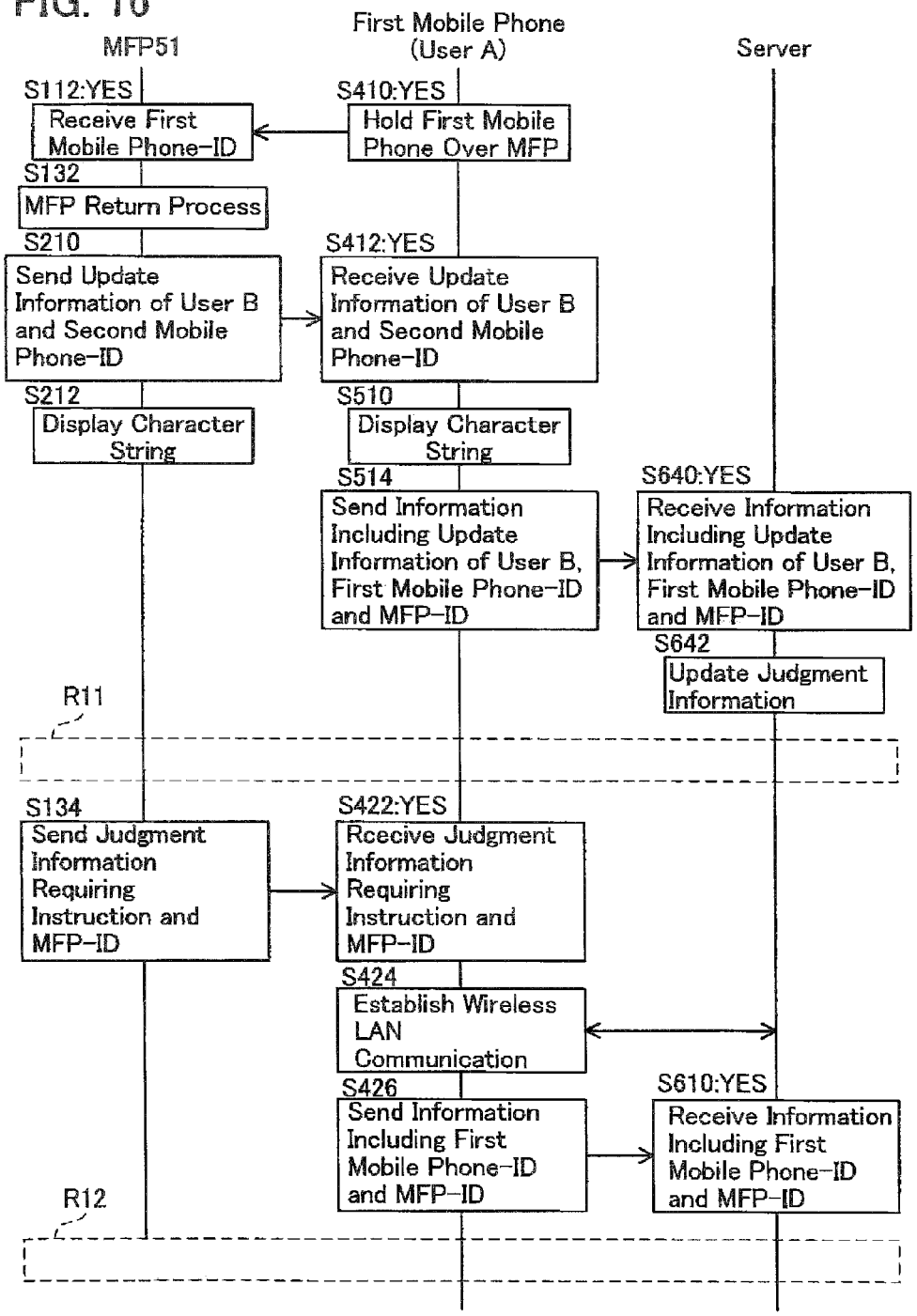
FIG. 16 shows a sequence diagram of the printing system.

A second operation example of the printing system 1 will be described with reference to the sequence diagram of FIG. 16. In the second operation example, an operation in which user A who is the user of the first mobile phone 8 sends the update information of user B who is the user of the second mobile phone 9 to the server 71 will be described. Moreover, a case where the update information associated with the second mobile phone ID is stored in the memory unit 33 will be described as an example. That is, a case where the user B who has logged in to the MFP 51 using the second mobile phone 9 and executed printing has forgotten to log out will be described.

When the user A holds the first mobile phone 8 over the MFP 51, an access is realized by NFC communication 201 (S410: YES). Since the access is realized by the NFC communication 201 (S112: YES), the MFP 51 receives the first mobile phone ID of the first mobile phone 8 of the NFC communication destination (S113). The update information associated with the second mobile phone ID, which is the update information of the user B, is stored in the memory unit 33 (S130: YES). Thus, the MFP 51 executes the MFP return process (S132).

The content of the MFP return process performed for the update information of the user B will be described. The MFP 51 sends the update information of the user B and the second mobile phone ID corresponding to the update information to the first mobile phone 8 (S210). Upon receiving the update information of the user B and the second mobile phone ID corresponding to the update information from the MFP 51 (S412: YES), the first mobile phone 8 displays a character string on the panel 18 (S510) and establishes wireless LAN communication 211 with the access point 62 (S512). The first mobile phone 8 sends the update information of the user B, the second mobile phone ID corresponding to the update information, the first mobile phone ID of the first mobile phone 8 of the destination, and the MFP-ID 51*a* to the server 71 (S514). Upon receiving the update information of the user B, the second mobile phone ID, the first mobile phone ID, and the MFP-ID 51*a* from the first mobile phone 8 (S640: YES), the server 71 updates the judgment information 302 corresponding to the second mobile phone 9 using the update information of the user B (S642). The subsequent processing contents of the MFP return process performed for the update information of the user B are the same as the processing contents in region R11 of the sequence diagram of FIG. 15 in the first operation example. Thus, the description thereof will not be provided.

When the MFP return process (S132) ends, the login process of the first mobile phone 8 to the MFP 51 is performed. The content of the login process of the first mobile phone 8 will be described. The MFP 51 sends judgment information requesting instruction information and the MFP-ID 51*a* to the first mobile phone 8 (S134). Upon receiving the judgment information requesting instruction information and the MFP-ID 51*a* from the MFP 51 (S422: YES), the first mobile phone 8 establishes wireless LAN communication 211 with the access point 62 (S424). The first mobile phone 8 sends second judgment information requesting instruction information, the first mobile phone ID, and the MFP-ID 51*a* to the server 71 (S426). The server 71 receives the second judgment information requesting instruction information, the first mobile phone ID, and the MFP-ID 51*a* from the first mobile phone 8 (S610: YES). The subsequent processing contents of the login process of the first mobile phone 8 are the same as the processing contents in region R12 of the sequence diagram of FIG. 14 in the first operation example. Thus, the description thereof will not be provided.

In this manner, when the user A initiates the NFC communication 201 with the MFP 51 using the first mobile phone 8, the first mobile phone 8 can send the update information (the update information of the user B) corresponding to the second mobile phone 9 to the server 71 as a proxy for the second mobile phone 2. As a result, it is possible to prevent the occurrence of a situation in which the update information of the user B is left unused in a state of being stored in the memory unit 33 without being sent to the server 71.

<Third Operation Example of Printing System>

Figure 17:
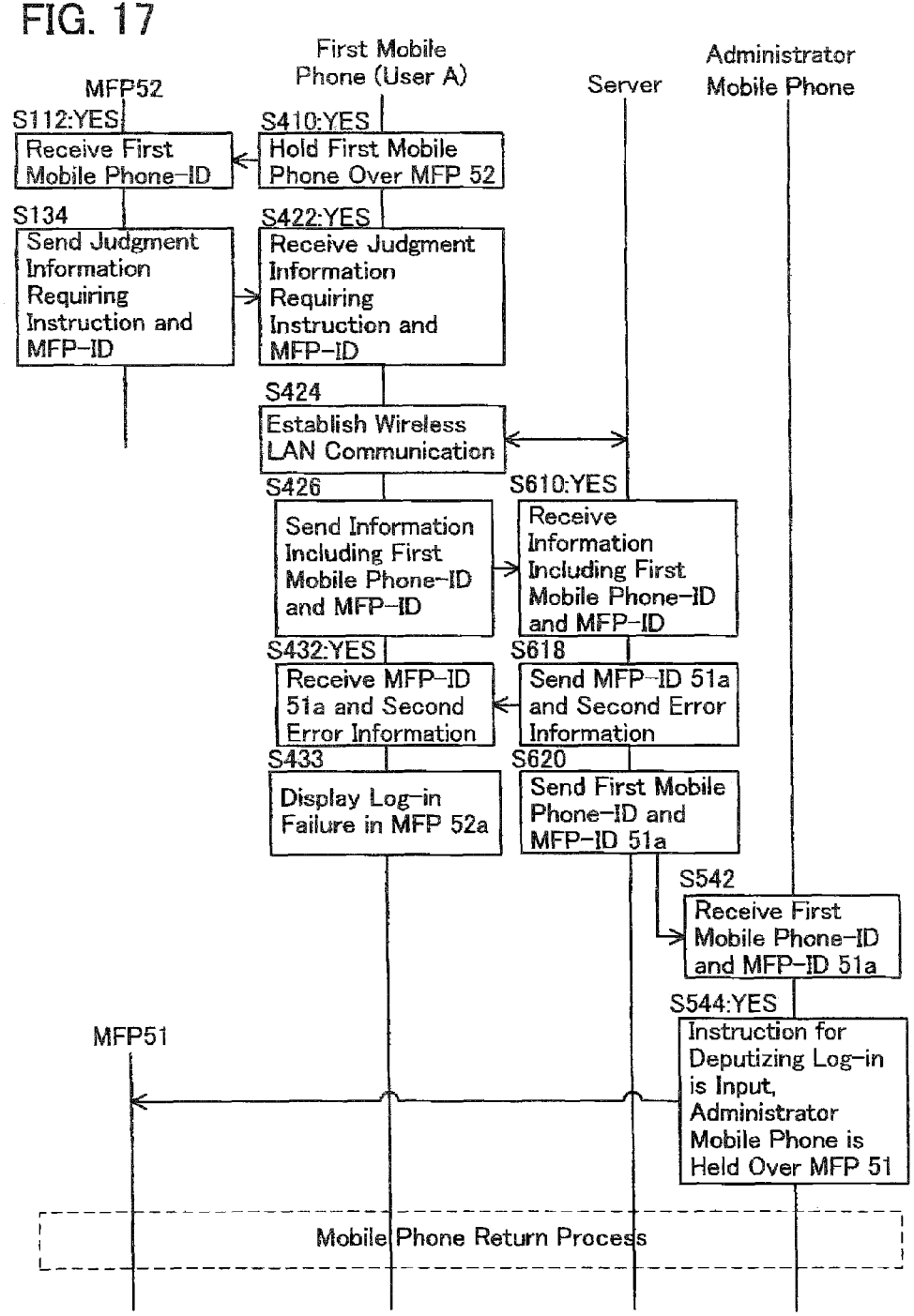
FIG. 17 shows a sequence diagram of the printing system.

A third operation example of the printing system 1 will be described with reference to the sequence diagram of FIG. 17. In the third operation example, an operation in which an administrator who is the user of the administrator mobile phone 10 sends the update information of user A who is the user of the first mobile phone 8 to the server 71 will be described. A case where the first mobile phone 8 is caused to log in to the MFP 52 in a period where the first mobile phone 8 is logged in to the MFP 51 will be described as an example. Moreover, a case where the update information associated with the first mobile phone ID is stored in the memory unit 33 of the MFP 51 will be described as an example. That is, a case where the user A who has logged in to the MFP 51 using the first mobile phone 8 and executed printing has forgotten to execute logout, and the user A tries to log in to the MFP 52 using the first mobile phone 8 will be described.

When the user A holds the first mobile phone 8 over the MFP 52, an access is realized by NFC communication (S410: YES). The MFP 52 receives the first mobile phone ID of the first mobile phone 8 of the NFC communication destination (S113). The MFP 52 sends judgment information requesting instruction information and the MFP-ID 52*a* of the MFP 52 to the first mobile phone 8 (S134). Upon receiving the judgment information requesting instruction information and the MFP-ID 52*a* from the MFP 52 (S422: YES), the first mobile phone 8 sends second judgment information requesting instruction information, the first mobile phone ID, and the MFP-ID 52*a* to the server 71 (S426).

The server 71 receives the first mobile phone ID and the MFP-ID 52*a* from the first mobile phone 8 (S610: YES). Since the logged-in flag 303 corresponding to the first mobile phone ID is "ON" (S616: YES), and the logged-in MFP-ID 304 corresponding to the first mobile phone ID is "MFP-ID 51*a* of MFP 51", it is judged that the first mobile phone 8 is logged in to the MFP 51. The server 71 sends the logged-in MFP-ID 304 (="MFP-ID 51*a* of MFP 51") and second error information to the first mobile phone 8 (S618). Moreover, the server 71 sends the first mobile phone ID and the logged-in MFP-ID 304 (="MFP-ID 51*a* of MFP 51") to the administrator mobile phone 10 (S620).

The first mobile phone 8 receives the second error information and the logged-in MFP-ID 304 (S432: YES). The first mobile phone 8 displays a message "Failed to log in to the MFP 52 since the mobile phone is being logged in to the MFP 51" on the panel 18 (S433).

The administrator mobile phone 10 is accessed by wireless LAN communication 213 (S540: YES). The administrator mobile phone 10 receives the first mobile phone ID and the logged-in MFP-ID 304 (="MFP-ID 51*a* of MFP 51") from the server 71 (S542). Moreover, a message indicating that the first mobile phone 8 remains in a state of being logged in to the MFP 51 is displayed on the panel of the administrator mobile phone 10. When the administrator inputs an instruction to deputize logout (S544: YES), and holds the administrator mobile phone 10 over the MFP 51, the mobile phone return process is executed (S546). The content of the mobile phone return process is the same as the processing content during the period T3 in the first operation example, and the description thereof will not be provided.

In this manner, the administrator mobile phone 10 can execute logout of the first mobile phone 8 from the MFP 51 as a proxy for the first mobile phone 8. Thus, the user A can log in to the MFP 52 using the first mobile phone 8.

<Advantages>

Advantages of the printing system 1 according to this embodiment will be described. In the MFP 51 disclosed in this description, when setting to restrict wireless LAN communication is set (S332: YES), only the NFC S/R unit 36 serves as communication means. Moreover, direct communication with the access point 62 cannot be realized in the NFC communication executed by the NFC S/R unit 36. As a result, since a state in which the MFPs 51 and 52 are not directly connected to the access point 62 can be created, it is possible to secure communication security. Moreover, it is possible to relay communication of the judgment information between the server 71 and the MFPs 51 and 52 using the NFC communications 201 to 203 and the wireless LAN communications 211 to 213 executed by the first mobile phone 8, the second mobile phone 9, and the administrator mobile phone 10. As a result, the MFPs 51 and 52 can execute the printing process based on the judgment information stored in the server 71 (S316). Thus, the server 71 can control the printing process of the MFPs 51 and 52 while securing the communication security of the MFPs 51 and 52.

It is possible to relay communication of the update information between the server 71 and the MFPs 51 and 52 using the NFC communications 201 to 203 and the wireless LAN communications 211 to 213 executed by the first mobile phone 8, the second mobile phone 9, and the administrator mobile phone 10. As a result, it is possible to update the judgment information managed by the server 71 based on the results of the printing process (S642).

It is possible to make settings as to whether or not to restrict wireless LAN communication between the MFPs 51 and 52 and the access point 62 (S332). As a result, it is possible to control the printing process performed by the MFPs 51 and 52 which are restricted to perform wireless LAN communication with the access point 62 according to the judgment information stored in the server 71.

With a simple operation of moving the first mobile phone 8, the second mobile phone 9, and the administrator mobile phone 10 so as to approach the MFP 51 or 52, the approaching mobile phone can be selected as a communication counterpart (S112, S410). That is, it is possible to intuitively select a communication counterpart MFP among the MFPs 51 and 52 using the NFC communication scheme.

It is possible to relay communication of the judgment information between the server 71 and the MFPs 51 and 52 using the first mobile phone 8, the second mobile phone 9, and the administrator mobile phone 10. As a result, even when the server 71 is present outside the communication range of the NFC communications 201 to 203, it is possible to control the image data processing of the MFPs 51 and 52 based on the judgment information stored in the server 71.

In response to an event in which a mobile phone being logged in to the MFP initiates NFC communication (S120: YES), it is possible to send the update information stored in the memory unit 33 to the server 71 (S126). Thus, since the need to input an operation of sending the update information to the server 71 to the button inputting unit 38 or the like can be eliminated, it is possible to improve user's convenience.

There is a case where the NFC communications 201 to 203 cannot be established between the MFP 51 and respective one of the first mobile phone 8, the second mobile phone 9, and the administrator mobile phone 10, before the MFP 51 sends the update information to the server 71 via the first mobile phone 8, the second mobile phone 9, and the administrator mobile phone 10 after the MFP 51 receives the judgment information from the server 71 via the first mobile phone 8, the second mobile phone 9, and the administrator mobile phone 10 and executes image data processing. In this case, when the NFC communications 201 to 203 are resumed subsequently, it is possible to send the update information stored in the memory unit 33 of the MFP 51 to the server 71 via the first mobile phone 8, the second mobile phone 9, and the administrator mobile phone 10. Thus, it is possible to prevent the occurrence of a situation where the update information is left unused in a state of being stored in the memory unit 33 without being sent to the server 71.

When a mobile phone logs in to the MFP successfully, it is possible to display a message on the panel 39 of the MFP, indicating that the mobile phone needs to log out after executing the printing process (S144). As a result, when the MFP executes the image data processing, the user can be made aware of the fact that the user needs to maintain the state where the NFC communications 201 to 203 are allowed until the update information is completely sent. Moreover, even when a state where the NFC communications 201 to 203 are not allowed is temporarily created before the update information is sent, the user can be made aware of the fact that it is only necessary to reestablish the NFC communications 201 to 203 later. Thus, it is possible to prevent the occurrence of a situation where the update information is left unused in a state of being stored in the memory unit 33 without being sent to the server 71.

When another mobile phone different from the mobile phone which is the source of the judgment information initiates NFC communication with the MFP, the other mobile phone can send the update information stored in the memory unit to the server 71 as a proxy for the mobile phone which is the source of the judgment information. As a result, it is possible to prevent the occurrence of a situation where the update information is left unused in a state of being stored in the memory unit of the MFP without being sent to the server 71.

When the update information associated with a mobile phone (for example, the first and second mobile phones 8 and 9) other than the administrator mobile phone 10 is stored in the memory unit of the MFP (S116: YES), it is possible to send the update information to the server 71 using the administrator mobile phone 10. As a result, it is possible to prevent the occurrence of a situation where the execution result information is left unused in a state of being stored in the memory unit of the MFP without being sent to the server 71.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

<Modification>

Although a mode in which the server 71 updates the judgment information using the update information received from the MFP (S642) has been described, the present invention is not limited to such a mode. The MFP may generate updated judgment information (S318) by updating the judgment information according to the print execution content (S316). Specifically, when the judgment information indicates that printing of up to 10 sheets is allowed, and printing of 5 sheets has been allowed and printing of 5 sheets have been finished, in S318, the CPU 32 may subtract 5 sheets from the judgment information and generate updated judgment information which is the judgment information indicating that printing of up to 5 sheets is allowed. Moreover, the MFP may send the updated judgment information instead of the update information (S210). The server 71 may execute a process of overwriting the judgment information stored in the management table 77 with the updated judgment information instead of executing the process (S642) of updating the judgment information using the update information. As a result, it is possible to reduce the load of the updating process of the server 71. Moreover, the mobile phone may generate updated judgment information by updating the judgment information using the update information received from the MFP. The mobile phone may send the updated judgment information instead of the update information (S514). Further, the server 71 may execute a process of overwriting the judgment information stored in the management table 77 with the updated judgment information instead of executing the process (S642) of updating the judgment information using the update information. As a result, it is possible to reduce the load of the updating process of the server 71.

In this embodiment, although a case where the number of mobile phones that can log in to the MFP 51 is restricted to one has been described, the present invention is not limited to such a mode, a plurality of mobile phones may be allowed to log in to the MFP 51 simultaneously. When such control is performed, S128 and S129 may be omitted from the flowchart of FIG. 2.

The update information on the first mobile phone 8 stored in the MFP may be allowed to be sent to the server 71 only when the first mobile phone 8 is used. Similarly, the update information on the second mobile phone 9 stored in the MFP may be allowed to be sent to the server 71 only when the second mobile phone 9 is used. When such control is performed, S130 and S132 may be omitted from the flowchart of FIG. 3.

Although a case where the NFC communication executed by the NFC S/R unit 36 is communication which does not use authentication information has been described, the present invention is not limited to such a mode. NFC communication which uses authentication information such as a PIN code may be used.

The operation in S144 of informing that login has been performed successfully and it is necessary to perform logout may be performed at any point in time. For example, the informing operation may be performed immediately before or after the step (S134) of sending the judgment information requesting instruction information and may be performed immediately before or after the step (S142) of storing the judgment information in the memory unit 33. The operation in S144 of informing that login has been performed successfully and it is necessary to perform logout is not limited to a mode in which a character string is displayed on the panel of the MFP. A mode may be employed in which an audible sound is output. Moreover, a mode may be employed in which instruction information for displaying a character string is sent to the mobile phone of the NFC communication destination. Or a mode may be employed in which the character string is displayed on the panel of the mobile phone. Further, instruction information for outputting an audible sound may be sent to the mobile phone of the NFC communication destination so as to cause the mobile phone to output an audible sound.

Various communication schemes may be used for the NFC communications 201 to 203. For example, short-range data communication using infrared rays (infrared data association: IrDA), radio frequency identification (abbreviated as RFID), TransferJet (registered trademark), and Bluetooth (registered trademark) may be used. The communication scheme of the wireless LAN communications 211 to 213 and 220 is not limited to a wireless LAN scheme, and various other schemes may be used. For example, the Wi-Fi that is pursuant to the IEEE 802.11 series, the wide area network (abbreviated as WAN), and the Internet may be used.

The MFPs 51 and 52 may perform such control of forcibly logging a mobile phone out when a predetermined period has elapsed without logout processing being performed after the mobile phone has logged in. The forced logout process involves erasing the judgment information and the log-in flag for the mobile phone, in which a predetermined period has elapsed without logout processing being performed after the mobile phone has logged in, from the memory unit 33.

When a predetermined period has elapsed in a state where the logged-in flag 303 in the management table 77 is "ON", the server 71 may send the mobile phone ID of the mobile phone corresponding to the logged-in flag 303 in the "ON" state and the MFP-ID corresponding to the logged-in flag 303 in the "ON" state to the administrator mobile phone 10. Upon receiving the mobile phone ID and the MFP-ID from the server 71 (S542), the administrator mobile phone 10 may accept the input of the instruction to deputize logout (S544). In this manner, the administrator can execute the logout processing as a proxy by holding the administrator mobile phone 10 over the MFP.

The MFPs 51 and 52 may not have the wireless S/R unit 34 and may be configured to be not capable of executing wireless LAN communication with the access point 62. In this case, the wireless LAN communication setting process of FIG. 6 may be omitted.

The technique disclosed in this description can also be applied to a case where the wireless LAN communication of the wireless S/R unit 34 is enabled in the MFPs 51 and 52. In this case, in normal time, by communicating with the server 71 by wireless LAN communication via the access point 62, the image data processing of the MFPs 51 and 52 is controlled according to the judgment information stored in the server. Moreover, when such an abnormality that wireless LAN communication cannot be established between the MFPs 51 and 52 and the server 71 occurs due to a fault of the wireless S/R unit 34 or a fault of the access point 62, by allowing the first or second mobile phone 8 or 9 to relay the judgment information, the image data processing of the MFPs 51 and 52 can be controlled according to the judgment information stored in the server. In this manner, since it is possible to provide a plurality of communication systems, even when an abnormality occurs in the wireless LAN communication, the server 71 can manage the MFPs 51 and 52 in a centralized manner.

The device used in the printing system 1 is not limited to such a multifunction device such as the MFPs 51 and 52. For example, a printer, a scanner, a copying machine, a FAX machine, and the like may be used.

Although the MFP 51 stores the information for identifying the administrator mobile phone 10 in the memory unit 33 as the administrator mobile phone ID, the present invention is not limited to such a mode. Information for identifying an optional mobile phone such as the information for identifying the first or second mobile phone 8 or 9 may be stored as the administrator mobile phone ID. For example, when the information for identifying the first mobile phone 8 is stored in the memory unit 33 as the administrator mobile phone ID, the first mobile phone 8 performs the function of the administrator mobile phone as well as the function of the mobile phone for general users. Further, when an access is realized from a mobile phone having the administrator mobile phone ID (S114: YES), the MFP 51 may accept the input that gives an instruction as to whether the accessing mobile phone will be treated as an administrator mobile phone or a mobile phone for general users. When an instruction to treat the mobile phone as the administrator mobile phone is input from the user, the flow may proceed to S116 and the process corresponding to the administrator mobile phone may be executed. When an instruction to treat the mobile phone as the mobile phone for general users is input from the user, the flow may proceed to S120 and the process corresponding to the other mobile phones may be executed.

The MFP-ID is not limited to the manufacturing serial number. Any information that can identify individual MFPs may be used, and for example, the MAC address may be used.

The first mobile phone 8, the second mobile phone 9, and the administrator mobile phone 10 included in the printing system 1 are merely examples. The technique of the present application can be applied to a case where four mobile phones or more are included in the printing system 1. The MFPs 51 and 52 included in the printing system 1 are merely examples. The technique of the present application can be applied to a case where three MFPs or more are included in the printing system 1.

In each of the above-mentioned embodiments, functions are realized by the CPU 32 or the CPU 72 performing process in accordance with a program. However, at least one of the functions may also be realized with hardware such as a logic circuit.

MFPs 51 and 52 are examples of "an image data processing device". A server 71 is example of "a management device". NFC communications 201 to 203 are examples of "first communication scheme". Wireless LAN communications 211 to 213 are examples of "a second communication scheme". A first mobile phone and a second mobile phone 9 are examples of "an electronic device". A CPU 32 is an example of "a processor". An NFC S/R unit 36 is an example of "a communication device". A CPU executing S142 is an example of "(A) causing". A CPU executing S316 is an example of "(B) processing". A CPU executing S318 is an example of "(C) causing". A CPU executing S210 is an example of "(D) controlling". A wireless S/R unit 34 is an example of "a second communication scheme communication module". A button inputting unit 38 is an example of "an input reception module". A CPU executing S334 is an example of "(E) causing". A CPU executing S144 is an example of "(F) performing". An administrator mobile phone 10 is an example of "a proxy electronic device". A first mobile phone ID, a second mobile phone ID and an administrator mobile phone ID are examples of "identification information".

The invention claimed is:

1. An image data processing device configured to be used in a system, the system comprising the image data processing device, a management device and a plurality of electronic devices, the management device being configured to store judgment information corresponding to each of the plurality of electronic devices, respectively, the judgment information being for causing a processor to judge restrictions imposed on printing to be performed by the processor for each of the plurality of electronic devices, each of the plurality of electronic devices being configured to execute a communication by using a first communication scheme with the image data processing device, each of the plurality of electronic devices being configured to execute a communication by using a second communication scheme with the management device, the first communication scheme differing from the second communication scheme, and each of the plurality of electronic devices being configured to receive the judgment information corresponding to the electronic device thereof from the management device, the image data processing device comprising:

a communication unit configured to communicate with each of the plurality of electronic devices by using the first communication scheme; and the processor configured to perform:

(A) causing, in a case where the communication unit receives the judgment information from one electronic device among the plurality of electronic devices, a storing unit to store the received judgment information; and, (B) printing the image data, wherein the above (B) includes executing the printing in a case where it is determined that the processor is able to execute the printing based on the judgment information stored by the storing unit.

2. The image data processing device as in claim 1, wherein the processor is further configured to perform:

(C) causing the storing unit to store update information or updated judgment information, in a case where the above (B) includes executing the printing,
the update information being information for updating the judgment information,
the updated judgment information being information updated based on a result of the data processing, and
(D) controlling the communication unit so that the communication unit sends the update information or the updated judgment information to the one electronic device, in a case where the update information or the updated judgment information is stored in the storing unit.

3. The image data processing device as in claim 2, wherein
the communication unit communicates with each of the plurality of electronic devices by using the first communication scheme, and
the first communication scheme has a smaller effective communication range than the second communication scheme.

4. The image data processing device as in claim 3, wherein
the communication unit communicates with each of the plurality of electronic devices by using the first communication scheme, and
the first communication scheme has an effective communication range that is within one meter.

5. The image data processing device as in claim 4, wherein
the communication unit communicates with each of the plurality of electronic devices by using a communication scheme of an NFC interface protocol.

6. The image data processing device as in claim 4, wherein
the above (D) includes controlling the communication unit so that the communication unit sends the update information to the one electronic device, in a case where the communication unit comes to be in a state capable of communicating with the one electronic device from a state of not being able to communicate with the one electronic device, and in a case where the storing unit stores the update information.

7. The image data processing device as in claim 6, wherein the processor is further configured to perform:
(F) performing a control for notifying that the communication unit needs to be in the state capable of communicating with the one electronic device, when the above (A) includes causing the storing unit to store the judgment information.

8. The image data processing device as in claim 6, wherein
the above (C) includes causing the storing unit to store the update information corresponding to first identification information,
the first identification information is information that causes the processor to identify an electronic device that is a source of the judgment information,
the above (D) includes controlling the communication unit so that the communication unit sends the update information stored by the storing unit to a particular electronic device, in a case where the communication unit communicates with the particular electronic device that is different from the source of the judgment information, and
the above (C) includes causing the storing unit to store the judgment information, in a case where the communication unit receives the judgment information from the particular electronic device.

9. The image data processing device as in claim 8, wherein
the storing unit stores second identification information,
the second identification information is information that causes the processor to identify a proxy electronic device that is predetermined for sending the update information as a proxy, and
the above (D) includes controlling the communication unit so that the communication unit sends the update information stored by the storing unit to the proxy electronic device, when a communication is executed with the proxy electronic device.

10. The image data processing device as in claim 2, wherein
the above (C) includes causing the storing unit to store a plurality of the update information or a plurality of the updated judgment information for each of first identification information,
the first identification information is information that causes the processor to identify an electronic device that is a source of the judgment information,
the above (C) includes causing the storing unit to store the judgment information, in a case where the communication unit receives the judgment information from a particular electronic device that is different from the source of the judgment information,
the above (D) includes controlling the communication unit so that the communication unit sends the update information or the updated judgment information to the electronic device that is source of the judgment information, in a case where the communication unit comes to be in a state capable of communicating with the electronic device that is the source of the judgment information from a state of not being able to communicate with the electronic device that is the source of the judgment information, and in a case where the storing unit stores the update information or the updated judgment information corresponding to the electronic device that is the source of the judgment information, and
the above (D) includes controlling the communication unit so that the communication unit sends the update information or the updated judgment information to the particular electronic device, in a case where the communication unit comes to be in a state capable of communicating with the particular electronic device from a state of not being able to communicate with the particular electronic device, and in a case where the storing unit stores the update information or the updated judgment information corresponding to the particular electronic device.

11. The image data processing device as in claim 2, wherein
each judgment information is information for indicating a printable volume that is predeterminedly assigned to the corresponding electronic device,
the update information is information for updating the printable volume based on a number of medium printed in the printing,
the updated judgment information is information for indicating an updated printable volume updated based on a number of medium printed in the printing,
the above (D) includes controlling the communication unit so that the communication unit sends the update information or the updated judgment information to the management device via the one electronic device, and
the management device is further configured to:
update judgment information corresponding to the one electronic device based on the update information when the management device receives the update information; and overwrite the stored judgment information with the updated judgment information when the management device receives the updated judgment information.

12. The image data processing device as in claim 1, further comprising:
a second communication scheme communication unit configured to execute a communication by using the second communication scheme,
wherein
the processor is further configured to perform:
(E) causing the storing unit to store restriction information, in a case where an input reception unit accepts restriction information that restricts a communication by the second communication scheme communication unit,
the above (A) includes causing the storing unit to store the judgment information that is received by the communication unit from the one electronic device, in a case where the storing unit stores the restriction information, and
the above (A) includes not causing the storing unit to store the judgment information, in a case where the storing unit does not store the restriction information.

13. The image data processing device as in claim 1, wherein
each judgment information is information for indicating restriction on a printable volume of sheets that is predeterminedly assigned to the corresponding electronic device,
the above (B) includes printing the image data within the printable volume.

14. A non-transitory computer readable recording medium including a computer program for an electronic device configured to be used in a system,
the system comprising an image data processing device, a management device and a plurality of electronic devices,
the management device being configured to store judgment information corresponding to each of the plurality of electronic devices, respectively,
the judgment information being for causing the image data processing device to judge restrictions imposed on printing to be performed by the image data processing device for each of the plurality of electronic devices,
each of the plurality of electronic devices comprising a first electronic device-side communication unit and a second electronic device-side communication unit, the first electronic device-side communication unit being configured to execute a communication by using a first communication scheme with the image data processing device, the second electronic device-side communication unit being configured to execute a communication by using a second communication scheme with the management device, the first communication scheme differing from the second communication scheme,
the computer program including instructions for causing one or more processors mounted on the electronic device to function as:
an electronic device-side judgment information storing control module; and
an electronic device-side judgment information sending control module,
wherein
the electronic device-side judgment information storing control module causes, in a case where the second electronic device-side communication unit receives the judgment information from the management device, a storing unit to store the received judgment information, and
the electronic device-side judgment information sending control module controls the first electronic device-side communication unit so that the first electronic device-side communication unit sends the judgment information stored in the storing unit to the image data processing device when the first electronic device-side communication unit communicates with the image data processing device.

15. The non-transitory computer readable recording medium as in claim 14, wherein
each judgment information is information for indicating restriction on a printable volume of sheets that is predeterminedly assigned to the corresponding electronic device.

16. The non-transitory computer readable recording medium as in claim 14, wherein
each judgment information is information for indicating a printable volume that is predeterminedly assigned to the corresponding electronic device,
the electronic device-side judgment information storing control module further causes, in a case where the second electronic device-side communication unit receives update information or updated judgment information from the image data processing device in response to the execution of the printing, the storing unit to store the received update information or the received updated judgment information, and
the update information being information for updating the printable volume based on a number of medium printed in the printing,
the updated judgment information being information for indicating an updated printable volume updated based on a number of medium printed in the printing,
the electronic device-side judgment information sending control module further controls the first electronic device-side communication unit so that the first electronic device-side communication unit sends the update information or the updated judgment information stored in the storing unit to the management device,
the management device is further configured to:
update judgment information corresponding to the electronic device based on the update information when the management device receives the update information; and
overwrite the stored judgment information with the updated judgment information when the management device receives the updated judgment information.

17. A management device configured to be used in a system,
the system comprising an image data processing device, the management device and a plurality of electronic devices,
each of the plurality of electronic devices being configured to execute a communication by using a first communication scheme with the image data processing device,
each of the plurality of electronic devices being configured to execute a communication by using a second communication scheme with the management device, and
the first communication scheme differing from the second communication scheme,
the management device comprising:
a computer;
a storing unit configured to store judgment information corresponding to each of the plurality of electronic devices, the judgment information being for causing the image data processing device to judge restrictions imposed on printing to be performed by the image data processing device; and a management device-side communication unit configured to communicate with each of the plurality of electronic devices by using the second communication scheme, wherein the computer functions as a management device-side judgment information sending control module that controls the management device-side communication unit so that the management device-side communication unit sends the judgment information stored in the storing unit to one electronic device among the plurality of electronic devices when the management device-side communication unit communicates with the one electronic device.

18. The management device as in claim 17, wherein each judgment information is information for indicating restriction on a printable volume of sheets that is predeterminedly assigned to the corresponding electronic device.

19. The management device as in claim 17, wherein each judgment information is information for indicating a printable volume that is predeterminedly assigned to the corresponding electronic device, the computer functions as:

a management device-side receiving control module that controls the management device-side communication unit so that the management device-side communication unit receives update information or updated judgment information from the one electronic device in response to the execution of the printing, the update information being information for updating the printable volume based on a number of medium printed in the printing, the updated judgment information being information for indicating an updated printable volume updated based on a number of medium printed in the printing;

updating control module that updates judgment information corresponding to the one electronic device based on the update information when the management device-side communication unit receives the update information; and overwriting control module that overwrites the stored judgment information with the updated judgment information when the management device-side communication unit receives the updated judgment information.

* * * * *